(12) United States Patent
Ankri-Eliahoo

(10) Patent No.: US 12,496,019 B2
(45) Date of Patent: Dec. 16, 2025

(54) SYSTEM AND METHOD FOR SENSITIVITY-BASED PATIENT POSITIONING FOR EMISSION TOMOGRAPHY IMAGING

(71) Applicant: GE Precision Healthcare LLC, Waukesha, WI (US)

(72) Inventor: Galit Ankri-Eliahoo, Zichron-Yaakov (IL)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 149 days.

(21) Appl. No.: 18/488,713

(22) Filed: Oct. 17, 2023

(65) Prior Publication Data

US 2025/0120660 A1    Apr. 17, 2025

(51) Int. Cl.
| | |
|---|---|
| A61B 6/04 | (2006.01) |
| A61B 6/00 | (2024.01) |
| A61B 6/03 | (2006.01) |
| A61B 6/46 | (2024.01) |
| A61B 6/58 | (2024.01) |

(52) U.S. Cl.
CPC ............ *A61B 6/0407* (2013.01); *A61B 6/037* (2013.01); *A61B 6/463* (2013.01); *A61B 6/488* (2013.01); *A61B 6/587* (2013.01)

(58) Field of Classification Search
CPC ....... A61B 6/0407; A61B 6/037; A61B 6/463; A61B 6/488; A61B 6/587
See application file for complete search history.

(56) References Cited

U.S. PATENT DOCUMENTS

| | | | |
|---|---|---|---|
| 9,237,874 B2 | 1/2016 | DeMan et al. | |
| 11,096,633 B1 | 8/2021 | Qi et al. | |
| 2011/0127434 A1* | 6/2011 | Wollenweber | A61B 6/587 250/363.04 |
| 2020/0093452 A1 | 3/2020 | Bai et al. | |
| 2021/0106300 A1* | 4/2021 | Bal | A61B 6/0407 |
| 2021/0212642 A1* | 7/2021 | Nett | A61B 6/5205 |
| 2022/0047227 A1* | 2/2022 | Heukensfeldt Jansen | A61B 6/5264 |
| 2022/0061793 A1* | 3/2022 | Vaz | A61B 6/501 |
| 2022/0091286 A1* | 3/2022 | Panin | G06N 3/08 |

* cited by examiner

*Primary Examiner* — Sean A Frith
(74) *Attorney, Agent, or Firm* — Fletcher Yoder, P.C.

(57) ABSTRACT

A method for positioning of a subject for imaging includes generating an anatomical reference image of the subject based on scan data acquired during a scout scan and causing display, on a graphical user interface, of the anatomical reference image with a sensitivity ruler and a scan range. The sensitivity ruler indicates a detection sensitivity along an axial field of view of an emission tomography scanner. The method includes automatically adjusting a position of the subject so that a region of interest to be imaged is centered within the axial field of view to maximize the detection sensitivity during a diagnostic scan with the emission tomography scanner. The method includes acquiring emission tomography scan data of the region of interest during the diagnostic scan and reconstructing a diagnostic image based on the emission tomography scan data. The diagnostic image has higher image quality than the anatomical reference image.

20 Claims, 18 Drawing Sheets

SYSTEM AND METHOD FOR SENSITIVITY-BASED PATIENT POSITIONING FOR EMISSION TOMOGRAPHY IMAGING

BACKGROUND

The subject matter disclosed herein relates to medical imaging and, more particularly, to a system and method for sensitivity-based patient positioning for emission tomography imaging.

Diagnostic imaging technologies allow images of internal features of a patient to be non-invasively obtained and may provide information about the function and integrity of the patient's internal structures. Diagnostic imaging systems may operate based on various physical principles, including the emission or transmission of radiation from the patient tissues. For example, single photon emission computed tomography (SPECT) and positron emission tomography (PET) may utilize a radiopharmaceutical that is administered to a patient and whose breakdown results in the emission of gamma rays from locations within the patient's body. The radiopharmaceutical is typically selected so as to be preferentially or differentially distributed in the body based on the physiological or biochemical processes in the body. For example, a radiopharmaceutical may be selected that is preferentially processed or taken up by tumor tissue. In such an example, the radiopharmaceutical will typically be disposed in greater concentrations around tumor tissue within the patient.

In the context of PET imaging, the radiopharmaceutical typically breaks down or decays within the patient, releasing a positron which annihilates when encountering an electron and produces a pair of gamma rays moving in opposite directions. In SPECT imaging, a single gamma ray is generated when the radiopharmaceutical breaks down or decays within the patient. These gamma rays interact with detection mechanisms within the respective PET or SPECT scanner, which allow the decay events to be localized, thereby providing a view of where the radiopharmaceutical is distributed throughout the patient. In this manner, a caregiver can visualize where in the patient the radiopharmaceutical is disproportionately distributed and may thereby identify where physiological structures and/or biochemical processes of diagnostic significance are located within the patient.

A PET imaging system generates images that represent the distribution of positron-emitting nuclides within the body of a patient. When a positron interacts with an electron by annihilation, the entire mass of the positron-electron pair is converted into two 511 keV photons. The photons are emitted in opposite directions along a line of response. The two annihilation photons (known as a coincidence pair) can be detected by detectors that are placed along the line of response on a detector ring. When these photons arrive and are detected at the detector elements at the same or nearly the same time, this is referred to as coincidence or coincidence event (COIN). An image is then generated, based on the acquired data that includes the annihilation photon detection information.

A desire for greater sensitivity in PET, and the desire to image larger section of the patient at the same time, has led to an increase in the axial field of view (AFOV) of PET scanners along the longitudinal axis of the scanners. However, in certain PET imaging systems with a large axial AFOV with high sensitivity, the sensitivity may be maximal in the middle of the AFOV and the sensitivity may be lower at the edges.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computer-implemented method for positioning of a subject for imaging is provided. The computer-implemented method includes generating, via a processor, an anatomical reference image of the subject based on scan data acquired of the subject during a scout scan. The computer-implemented method also includes causing, via the processor, display on a graphical user interface, the anatomical reference image with a sensitivity ruler and a scan range, wherein the sensitivity ruler indicates a detection sensitivity along an axial field of view of an emission tomography scanner. The computer-implemented method further includes automatically adjusting, via the processor, a position of the subject so that a region of interest to be imaged is centered within the axial field of view to maximize the detection sensitivity during a diagnostic scan with the emission tomography scanner. The computer-implemented method still further includes acquiring, via the processor, emission tomography scan data of the region of interest during the diagnostic scan with the emission tomography scanner. The computer-implemented method even further includes reconstructing, via the processor, a diagnostic image based on the emission tomography scan data, wherein the diagnostic image has higher image quality than the anatomical reference image.

In another embodiment, a system for positioning of a subject for imaging is provided. The system includes a memory encoding processor-executable routines. The system also includes a processor configured to access the memory and to execute the processor-executable routines, wherein the processor-executable routines, when executed by the processor, cause the processor to perform actions. The actions include generating an anatomical reference image of the subject based on scan data acquired of the subject during a scout scan. The actions also include causing display, on a graphical user interface, of the anatomical reference image with a sensitivity ruler and a scan range, wherein the sensitivity ruler indicates a detection sensitivity along an axial field of view of an emission tomography scanner. The actions further include automatically adjusting a position of the subject so that a region of interest to be imaged is centered within the axial field of view to maximize the detection sensitivity during a diagnostic scan with the emission tomography scanner. The actions still further include acquiring emission tomography scan data of the region of interest during the diagnostic scan with the emission tomography scanner. The actions even further include reconstructing a diagnostic image based on the emission tomography scan data, wherein the diagnostic image has higher image quality than the anatomical reference image.

In a further embodiment, a non-transitory computer-readable medium is provided. The computer-readable medium includes processor-executable code that when executed by a processor, causes the processor to perform actions. The actions include generating an anatomical reference image of the subject based on scan data acquired of the subject during a scout scan. The actions also include causing display, on a graphical user interface, of the anatomical reference image with a sensitivity ruler and a scan range, wherein the sensitivity ruler indicates a detection sensitivity along an axial field of view of an emission tomography scanner. The actions further include automatically adjusting a position of the subject so that a region of interest to be imaged is centered within the axial field of view to maximize the detection sensitivity during a diagnostic scan with the emission tomography scanner. The actions still further include acquiring emission tomography scan data of the region of interest during the diagnostic scan with the emission tomography scanner. The actions even further include reconstructing a diagnostic image based on the emission tomography scan data, wherein the diagnostic image has higher image quality than the anatomical reference image.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
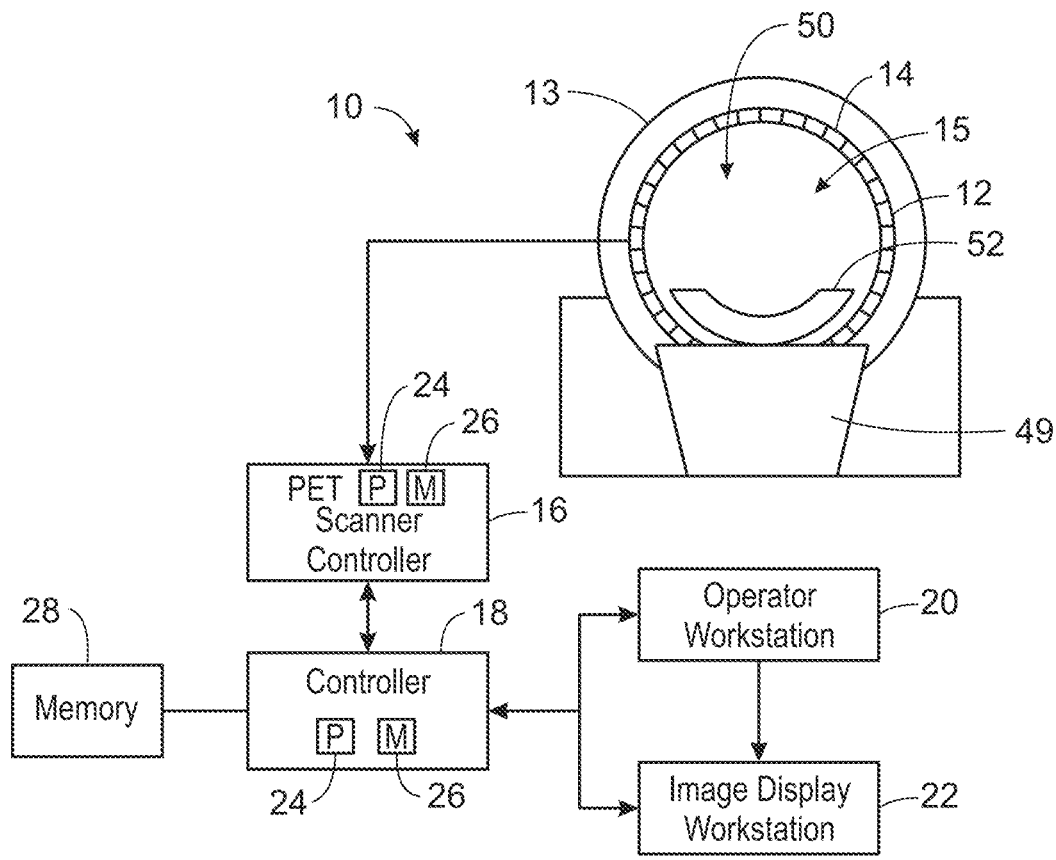
FIG. 1 is a diagrammatical representation of an embodiment of an emission tomography imaging system, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Furthermore, the term processor or processing unit, as used herein, refers to any type of processing unit or system that can carry out the required calculations needed for the various embodiments, such as single or multi-core: CPU, Accelerated Processing Unit (APU), Graphics Board, DSP, FPGA, ASIC, cloud-based system, or a combination thereof, or a plurality of separate processing units. In addition, parts of the methods described below may be executed on different processors.

The present disclosure provides systems and methods for positioning of a subject (e.g., patient) for imaging (e.g., PET imaging imaging). In particular, the described systems and methods adjust a position of the subject so that a region of interest (e.g., volume of interest) of the subject to be imaged is located within a central area of an axial field of view of the emission tomography scanner (e.g., along a longitudinal axis of the emission tomography scanner) to maximize detection sensitivity during a diagnostic scan with the emission tomography scanner. The disclosed systems and methods include generating an anatomical reference image of the subject based on scan data acquired of the subject during a scout scan. In certain embodiments, the anatomical reference image may be a CT scout image (e.g., acquired utilizing a CT scanner), a PET scout image (e.g., acquired utilizing a PET scanner), an external CT image (e.g., acquired with a different CT scanner), an image acquired via a visible and near infrared camera, or any image that presents anatomical references. The disclosed systems and methods also include causing display, on a graphical user interface, of the anatomical reference image with a sensitivity ruler and a scan range, wherein the sensitivity ruler indicates a detection sensitivity along an axial field of view of an emission tomography scanner. The disclosed systems and methods further include automatically adjusting a position of the subject so that a region of interest to be imaged is centered within the axial field of view to maximize the detection sensitivity during a diagnostic scan with the emission tomography scanner. The disclosed systems and methods still further include acquiring emission tomography scan data of the region of interest during the diagnostic scan with the emission tomography scanner. The disclosed systems and methods even further include reconstructing a diagnostic image based on the emission tomography scan data, wherein the diagnostic image has higher image quality than the anatomical reference image.

In certain embodiments, the disclosed systems and methods include receiving a selection of the region of interest to be imaged. In certain embodiments, automatically adjusting the position of the subject is based on the selection of the region of interest. In certain embodiments, the disclosed systems and methods include receiving a selection of a scan protocol for the diagnostic scan. In certain embodiments, automatically adjusting the position of the subject is based on the selection of the scan protocol. Some of the disclosed embodiments, when the region of interest (ROI) is smaller than, or equal to the field of view of the PET camera, ensure that a region of interest is located in the area of maximal detection sensitivity during the diagnostic scan, to improve the quality of the diagnostic image of the region of interest. If the ROI is larger than the AFOV, then there is a need to add another "bed position" (e.g., overlapping scan range), the overlap between the two "bed positions" increases the statistics of photon detection (the number of the events are summarized), therefore the sensitivity at that region is higher.

With the foregoing in mind and turning now to the drawings, FIG. 1 depicts a PET system 10 operating in accordance with certain aspects of the present disclosure. The PET imaging system of FIG. 1 may be utilized with a dual-modality imaging system such as a PET-CT imaging system described in FIG. 4.

Returning now to FIG. 1, the depicted PET system 10 includes a detector array 12. The detector array 12 of the PET system 10 typically includes a number of detector modules or detector assemblies (generally designated by reference numeral 14) arranged in a plurality of rings as depicted in FIG. 1. Each detector module 14 may include a scintillator block (e.g., having a plurality of scintillation crystals) and a photomultiplier tube (PMT) or other light sensor or photosensor (e.g. silicon avalanche photodiode, solid state photomultiplier, etc.). In certain embodiments, a respective photosensor is associated with a respective scintillator crystal. In some embodiments, direct conversion, solid-state photon detectors can be used. The PET imaging system 10 includes a gantry 13 that is configured to support a full ring annular detector array 12 thereon. The detector array 12 is positioned around the central opening/bore 50 and can be controlled to perform a normal "emission scan" in which positron annihilation events are counted. To this end, the detector modules 14 forming the detector array 12 generally generate intensity output signals corresponding to each annihilation photon (which are acquired by acquisition circuitry coupled to the detector modules 14).

The depicted PET system 10 also includes a PET scanner controller 16, a controller 18, an operator workstation 20, and an image display workstation 22 (e.g., for displaying an image). In certain embodiments, the PET scanner controller 16, controller 18, operator workstation 20, and image display workstation 22 may be combined into a single unit or device or fewer units or devices. The PET system 10 also includes a table 52 coupled to a table base 49. The table 52 is configured to be moved into and out of the opening/bore 50 with the patient on the table 52.

The PET scanner controller 16, which is coupled to the detector 12, may be coupled to the controller 18 to enable the controller 18 to control operation of the PET scanner controller 16. Alternatively, the PET scanner controller 16 may be coupled to the operator workstation 20 which controls the operation of the PET scanner controller 16. In operation, the controller 18 and/or the workstation 20 controls the real-time operation of the PET system 10. In certain embodiments the controller 18 and/or the workstation 20 may control the real-time operation of another imaging modality (e.g., the CT imaging system 56 in FIG. 4) to enable the simultaneous and/or separate acquisition of image data from the different imaging modalities. One or more of the PET scanner controller 16, the controller 18, and/or the operation workstation 20 may include a processor 24 and/or memory 26. In certain embodiments, the PET system 10 may include a separate memory 28. The detector 12, PET scanner controller 16, the controller 18, and/or the operation workstation 20 may include detector acquisition circuitry for acquiring image data from the detector 12 and image reconstruction and processing circuitry for image processing. The circuitry may include specially programmed hardware, memory, and/or processors.

The processor 24 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 24 may include one or more reduced instruction set (RISC) processors or complex instruction set (CISC) processors. The processor 24 may execute instructions to carry out the operation of the PET system 10. These instructions may be encoded in programs or code stored in a tangible non-transitory computer-readable medium (e.g., an optical disc, solid state device, chip, firmware, etc.) such as the memory 26, 28. In certain embodiments, the memory 26 may be wholly or partially removable from the controller 16, 18.

As described in greater detail below, the processor 24 is configured to optimize positioning of a subject (e.g., patient) for imaging (e.g., PET imaging imaging). In particular, processor 24 is configured to adjust a position of the subject, by controlling the vertical and axial position of the patient table 52, so that a region of interest (e.g., volume of interest) of the subject to be imaged is located within a central area of an axial field of view of the emission tomography scanner (e.g., along a longitudinal axis of the emission tomography scanner) to maximize detection sensitivity during a diagnostic scan with the emission tomography scanner. The processor 24 is configured to generate an anatomical reference image of the subject based on scan data acquired of the subject during a scout scan (e.g., non-diagnostic scan). A scout scan is typically performed prior to a diagnostic scan to set appropriate landmarks containing the region of interest of the subject (e.g., patient). Scout scans are shorter and typically have lower resolution (and in CT uses lower dose) than a diagnostic scan. Although at lower image quality, the scout scan shows the body and some of the main organs (where preferably the target organ can be distinguished). The processor 24 is also configured to cause display, on a graphical user interface, of the anatomical reference image with a sensitivity ruler and a scan range, wherein the sensitivity ruler indicates a detection sensitivity along an axial field of view of an emission tomography scanner. The processor 24 is further configured to automatically adjust a position of the subject so that a region of interest to be imaged is centered within the axial field of view to maximize the detection sensitivity during a diagnostic scan with the emission tomography scanner. In certain embodiments, the processor 24 is configured to receive a user input to proceed with the adjusting the position of the subject so that the region of interest to be imaged is centered within the axial field of view to maximize the detection sensitivity during the diagnostic scan with the emission tomography scanner. The processor 24 is still further configured to acquire emission tomography scan data of the region of interest during the diagnostic scan with the emission tomography scanner. The processor 24 is even further configured to reconstruct a diagnostic image based on the emission tomography scan data, wherein the diagnostic image has higher image quality than the anatomical reference image.

In certain embodiments, the processor 24 is configured to receive a selection of the region of interest to be imaged. In certain embodiments, the processor 24 is configured to automatically adjust the position of the subject based on the selection of the region of interest. In certain embodiments, the processor 24 is configured to receive a selection of a scan protocol for the diagnostic scan. In certain embodiments, the processor 24 is configured to automatically adjust the position of the subject based on the selection of the scan protocol.

By way of example, PET imaging is primarily used to measure metabolic activities that occur in tissues and organs and, in particular, to localize aberrant metabolic activity. In PET imaging, the patient is typically injected with a solution that contains a radioactive tracer. The solution is distributed and absorbed throughout the body in different degrees, depending on the tracer employed and the functioning of the organs and tissues. For instance, tumors typically process more glucose than a healthy tissue of the same type. Therefore, a glucose solution containing a radioactive tracer may be disproportionately metabolized by a tumor, allowing the tumor to be located and visualized by the radioactive emissions. In particular, the radioactive tracer emits positrons that interact with and annihilate complementary electrons to generate pairs of gamma rays. In each annihilation reaction, two gamma rays traveling in opposite directions are emitted. In a PET imaging system 10, the pair of gamma rays are detected by the detector array 12 configured to ascertain that two gamma rays detected sufficiently close in time are generated by the same annihilation reaction. Due to the nature of the annihilation reaction, the detection of such a pair of gamma rays may be used to determine the line of response along which the gamma rays traveled before impacting the detector, allowing localization of the annihilation event to that line. By detecting a number of such gamma ray pairs, and calculating the corresponding lines traveled by these pairs, the concentration of the radioactive tracer in different parts of the body may be estimated and a tumor, thereby, may be detected. Therefore, accurate detection and localization of the gamma rays forms a fundamental and foremost objective of the PET imaging system 10.

Figure 2:
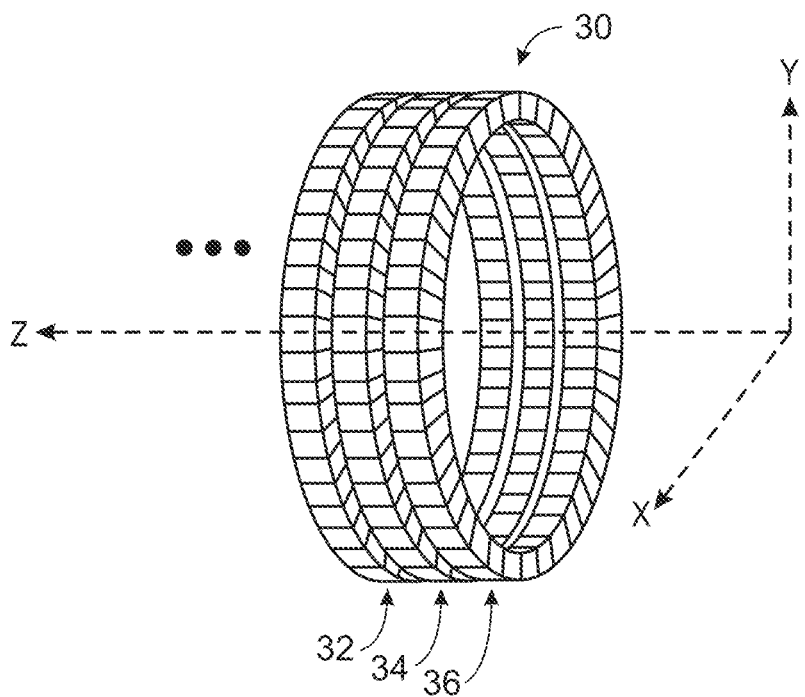
FIG. 2 is a schematic diagram of an embodiment of a 3-D PET scanner, in accordance with aspects of the present disclosure.

Data associated with coincidence events along a number of LORs may be collected and further processed to reconstruct three-dimensional (3-D) tomographic images. Modern PET scanners, specifically large AFOV scanners, operate in a 3-D PET mode, where coincidence events from different detector rings positioned along the axial direction are counted to obtain tomographic images. For example, a PET scanner 30 with multiple detector rings is shown in FIG. 2, where the individual detectors and photosensors are not shown. The PET scanner detector 30 includes a plurality of detector rings. In FIG. 2 only three detector rings 32, 34 and 36 of the plurality of detector rings are shown. The number of detector rings may vary (e.g., 2, 3, 4, 5, or more detector rings. In a larger AFOV PET detector, the number of detector rings is greater than 10 rings. Most narrow AFOV PET cameras have a sensitivity along their AFOV having the shape of a triangle, while are large AFOV PET scanner (e.g., having greater than 10 detector rings) can have a sensitivity along the AFOV having the shape of a trapezoid. However, some large AFOV PET scanner are having sensitivity along their AFOV having the shape of a triangle. In the disclosed embodiments, coincidence events may occur in different detector rings of different gantry segments of the modular gantry along the axial direction.

Traditionally, data associated with coincidence events are stored in the form of sinograms based on their corresponding LORs. For example, in a 3-D PET scanner 38 like the one illustrated in FIGS. 3A-D, if a pair of coincidence events are detected by detectors 40 and 42 in different detector rings 43, an LOR may be established as a straight line 44 linking the two detectors 40, 42. It should be noted for simplicity only five rings 53 are shown and only two of the five rings 53 are marked for simplicity. In a 3-D PET scanner, an LOR is defined by four coordinates (u, φ, v, θ), wherein the first coordinate u is the radial distance of the LOR from the center axis of the detector, the second coordinate q is the trans-axial angle between the LOR and the X-axis, the third coordinate v is the distance of the LOR from the center of the detector rings along the Z-axis, and the fourth coordinate θ is the axial angle between the LOR and the center axis (or Z-axis) of the detector rings. As the PET scanner continues to detect coincidence events along various LORs, these events may be binned and accumulated in their corresponding elements. In this case, the detected coincidence events are stored in a 4-D sinogram (u, φ, v, θ), where each element of which holds an event count for a specific LOR.

Figure 3A:
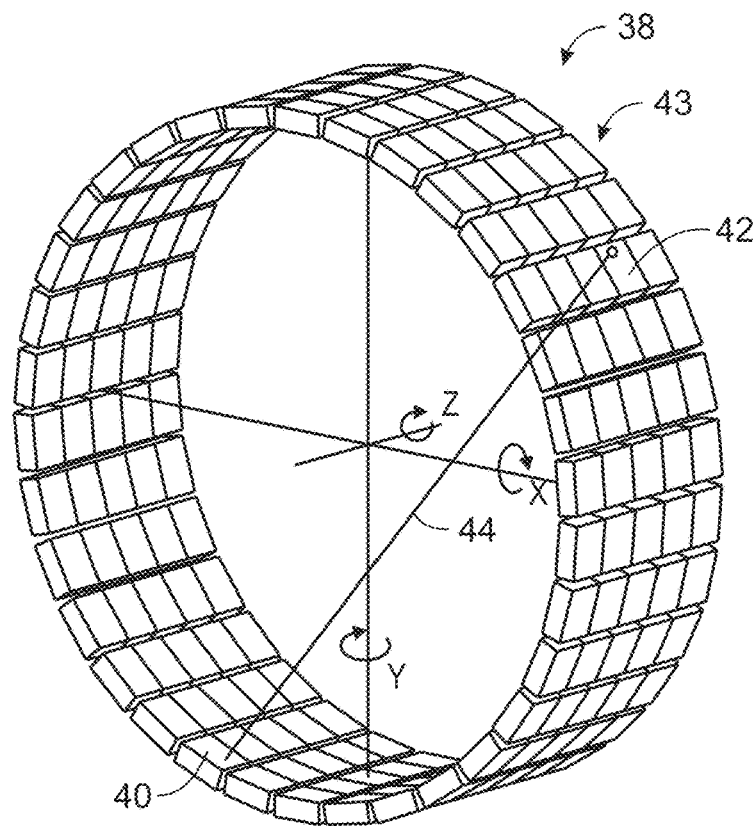
FIGS. 3A, 3B, 3C, and 3D are schematic diagrams of perspective view, a trans-axial view, a side view, and another side view illustrating a ring difference, respectively, of a portion of a 3D PET scanner illustrating a line of response (LOR) in a PET imaging system, in accordance with aspects of the present disclosure.
Figure 3B:
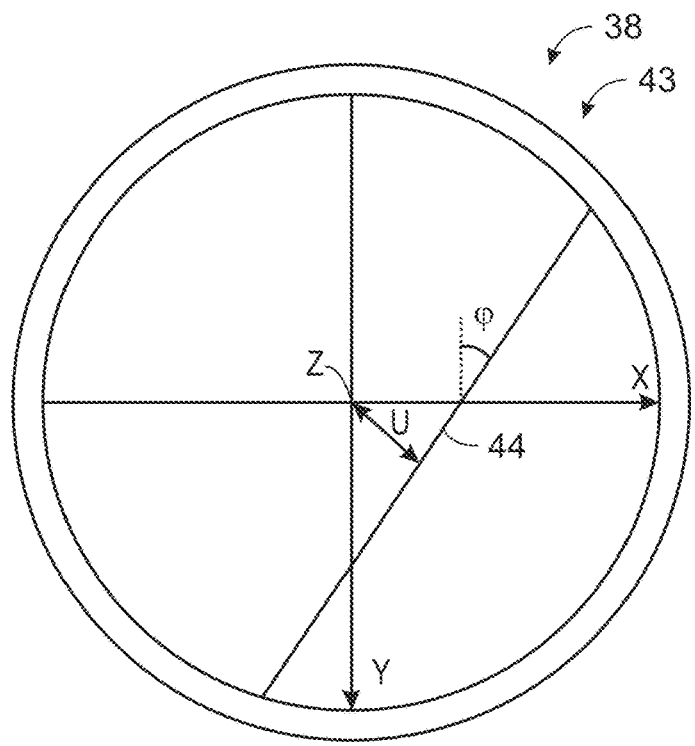
Figure 3C:
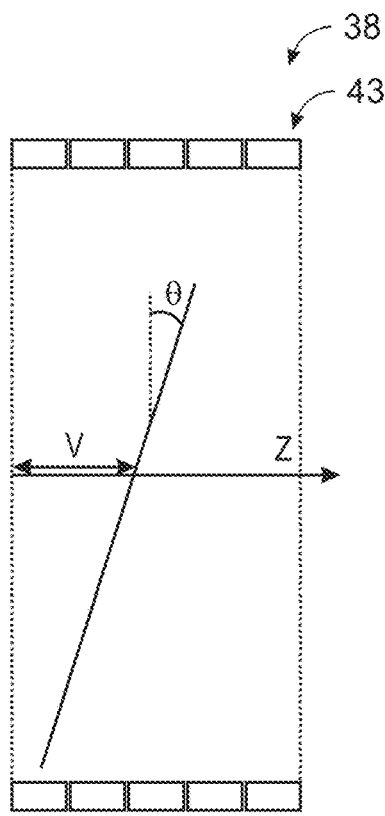
Figure 3D:
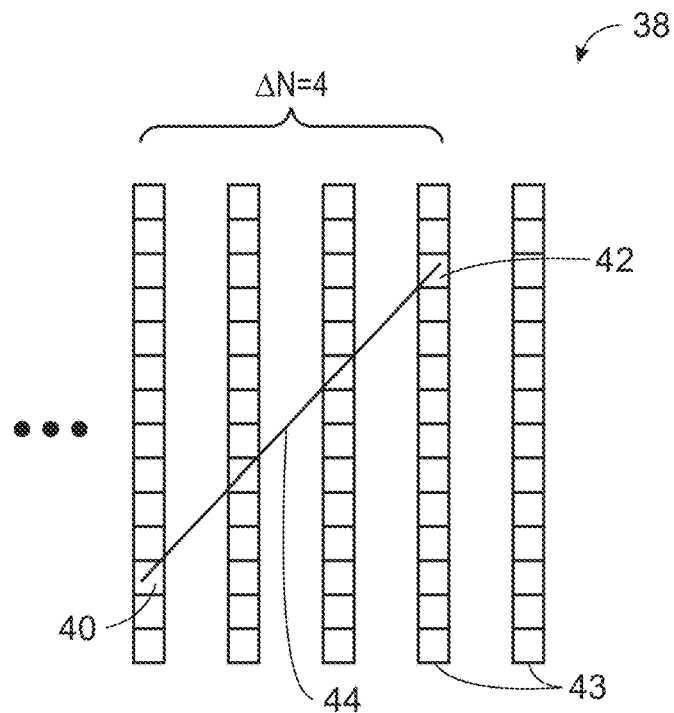

As illustrated in FIGS. 3C and 3D (which are a side views of a 3-D PET scanner 38 having a plurality of detector rings 43, (only five rings are drawn, and only two of the five are marked to avoid cluttering the drawing), a pair of coincidence events are detected by two detectors 40 and 42 on different detector rings 43, an LOR may be established as a straight line 44 linking the two detectors 40 and 42 As depicted in the example in FIG. 3D, there is a ring difference (ΔN) of 4. ΔN–max (which is implemented in software) defines the maximum number of adjacent detector rings 53 that are taken into account in generating an image. Coincidence events detected with ΔN>ΔN–max are not considered when reconstructing the 3D image. This maximum ring difference, ΔN–max, defines the size of edge regions 80 (i.e., number of rings to utilize for each edge region 80) of a sensitivity profile 76 discussed in FIGS. 5A-D. Optionally, ΔN–max is a user selected parameter, or is associated with a specific diagnostic protocol, or selected based on patient parameters such as weight, height, body mass index (BMI), etc. When ΔN–max is selected to be equal to the number of rings, the sensitivity profile is triangular.

Figure 4:
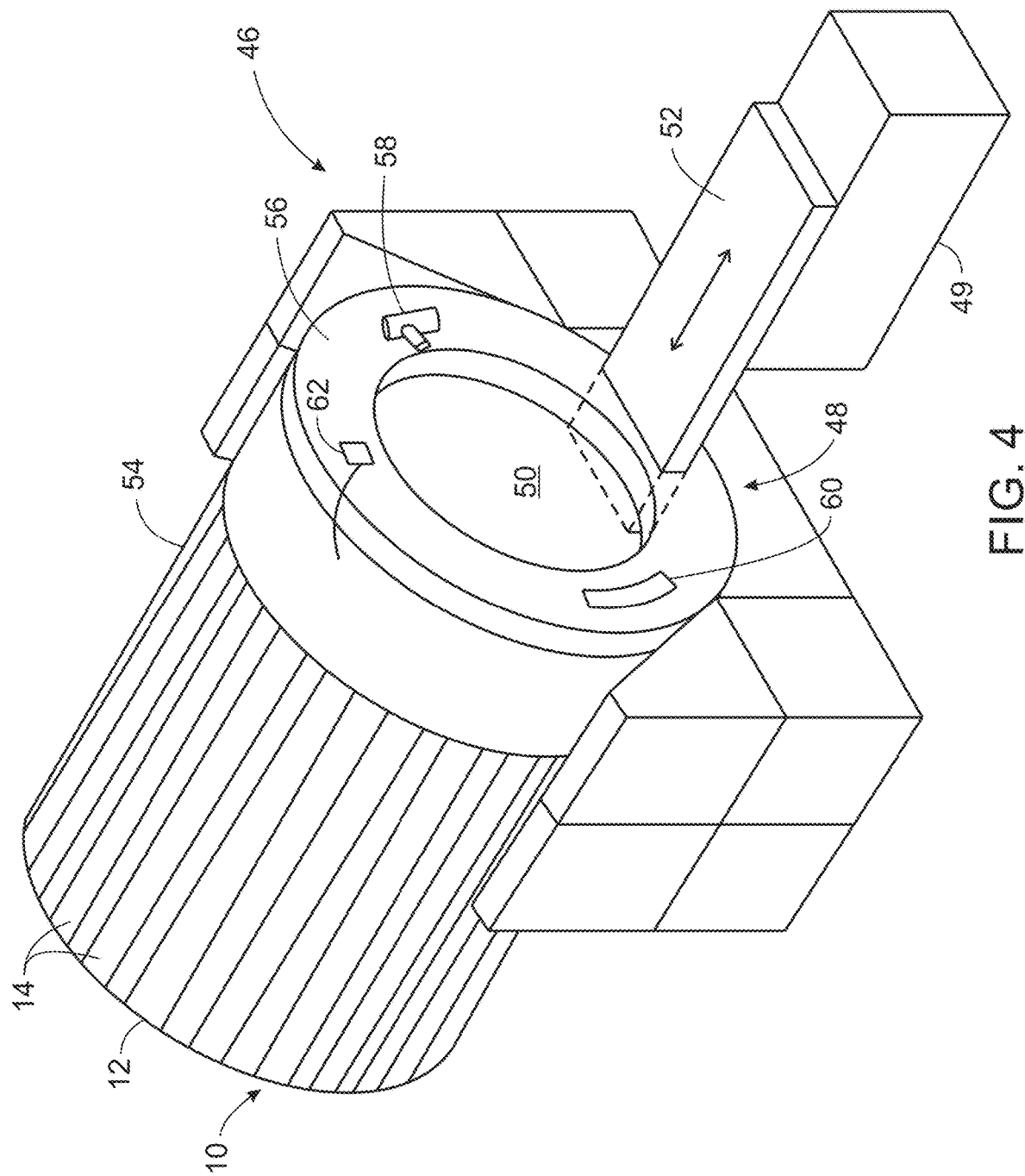
FIG. 4 is a perspective view of a PET-CT imaging system having the PET imaging system of FIG. 1, in accordance with aspects of the present disclosure.

As mentioned above, the PET system 10 may be incorporated into a dual-modality imaging system such as the PET-CT imaging system 46 in FIG. 4. Referring now to FIG. 4, the PET-CT imaging system 46 includes the PET system 10 and a CT system 48 positioned in fixed relationship to one another. The PET system 10 and CT system 48 are aligned to allow for translation of a patient (not shown) therethrough. In use, a patient is positioned within a bore 50 of the PET-CT imaging system 46 (via a table 52 controlled by a table controller that is controlled by the controller 18 and/or operator workstation 20 described in FIG. 2) to image a region of interest of the patient as is known in the art.

The PET system 10 includes a gantry 54 that is configured to support a full ring annular detector array 12 thereon (e.g., including the plurality of detector assemblies 14 in FIG. 1). The detector array 12 is positioned around the central opening/bore 50 and can be controlled to perform a normal "emission scan" in which positron annihilation events are counted. To this end, the detectors 14 forming array 12 generally generate intensity output signals corresponding to each detected annihilation photon.

The CT system 48 includes a rotatable gantry 56 having an X-ray source 58 thereon that projects a beam of X-rays toward a detector assembly 60 on the opposite side of the gantry 56. The detector assembly 60 senses the projected X-rays that pass through a patient and measures the intensity of an impinging X-ray beam and hence the attenuated beam as it passes through the patient. During a scan to acquire X-ray projection data, rotatable gantry 56 and the components mounted thereon rotate about a center of rotation. In certain embodiments, the CT system 48 may be controlled by the controller 18 and/or operator workstation 20 described in FIG. 2. In certain embodiments, the PET system 10 and the CT system 48 may share a single gantry. Image data may be acquired simultaneously and/or separately with the PET system 10 and the CT system 48. In certain embodiments, the CT system 48 may include an optical imaging system 62 (e.g., camera) coupled to a stationary portion of the CT system 48 (e.g., outer cover of CT system 48) for optically imaging the patient to assist in setting up the patient for a scan.

Figure 5A:
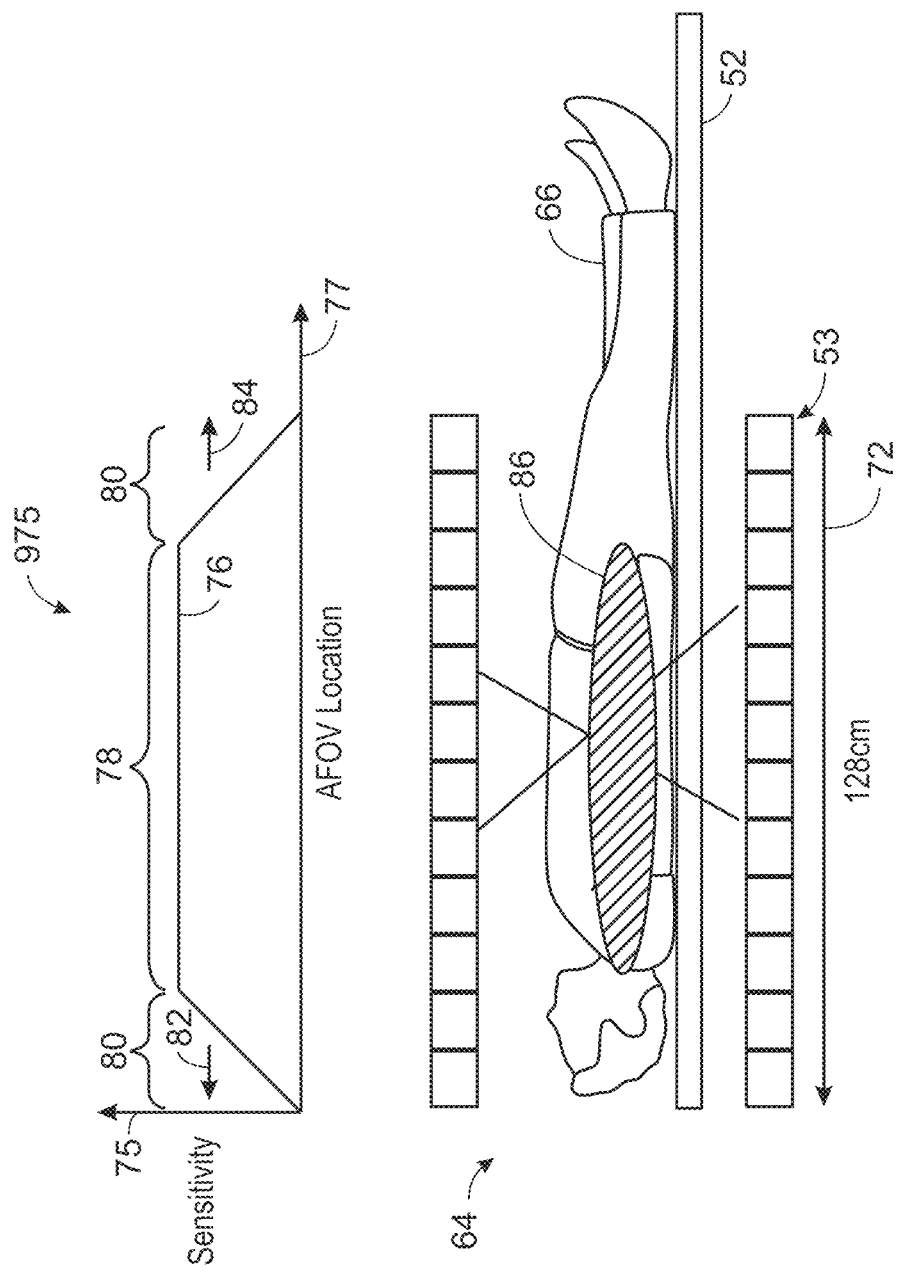
FIG. 5A is a graph of a sensitivity profile within an axial field of view of a PET scanner and a schematic view of the PET scanner during imaging of a large ROI relative to the sensitivity profile in accordance with aspects of the present disclosure.

FIG. 5A is a schematic view of a graph 975 a sensitivity profile 76 within an axial field of view of a PET scanner 64 (e.g., large axial field of view of the PET scanner 64) relative to the PET scanner 64. As depicted, a subject 66 (e.g., patient) is disposed on a table 52 and is positioned in a bore 50 of the PET scanner 64. The PET scanner 64 is configured for scanning the whole, or part of the body of the subject 66. As depicted in this example, the PET scanner 64 includes an axial field of view 72 of approximately 128 centimeters along a longitudinal axis 74 of the PET scanner 64. The length of the axial field of view (AFOV) 72 may vary depending on the PET scanner 64. As depicted, the PET scanner 64 includes a sensitivity profile 76 (e.g., detection sensitivity profile) within the PET scanner 64. The shape of the sensitivity profile 76, is illustrated in the graph 975. The Y-axis 75 and the X-axis 77 of the graph 975 represent sensitivity and AFOV location along the PET scanner 64. The sensitivity profile 76 has a trapezoidal shape. The sensitivity profile 76 has a center region 78 (plateau region) flanked by edge regions 80 that taper in directions 82, 84 away from the center region 78. The center region 78 of the sensitivity profile 76 provides maximum sensitivity. The sensitivity of the edge regions 80 decreases in the direction 82, 84 away from the center region 78. To ensure that a region of interest 86 of the subject 66 is scanned with the highest sensitivity, the subject 66 needs to be positioned so that region of interest 86 is centered within the center region 78 of the sensitivity profile 76.

Figure 5B:
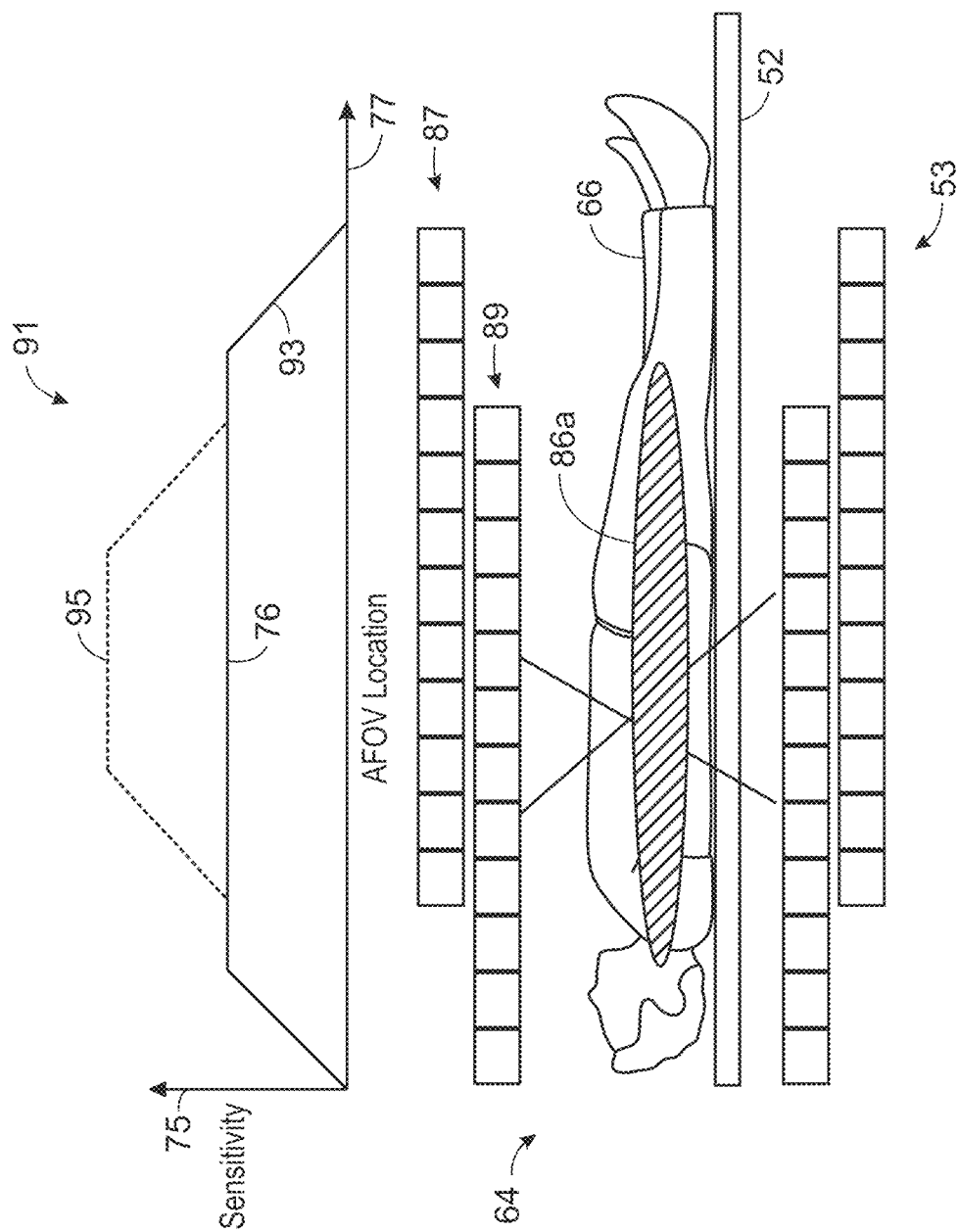
FIG. 5B is a graph of a sensitivity profile for overlapping scan ranges relative to an axial field of view of a PET scanner,) and a schematic view of the PET scanner relative to the sensitivity profile during imaging of a ROI larger than the axial field of view of a PET scanner, in accordance with aspects of the present disclosure.

In certain embodiments, as depicted in FIG. 5B, when the region of interest 86a is greater than the AFOV, scans with overlapping ranges may be utilized. In particular, bed 52 (with patient 66) is translated such that the AFOV is translated in respect to the patient. In FIG. 5B, patient 66 is shown as a reference, and the two positions of detector rings 53 relative to the patient are illustrated and marked as 87 and 89 (the vertical displacement between 87 and 89 does not exist in reality). In FIG. 5B, a graph 91 represents an overall sensitivity profile 93 for the two overlapping scan ranges and a sensitivity profile 95 for the overlapping region of the two scans.

Figure 5C:
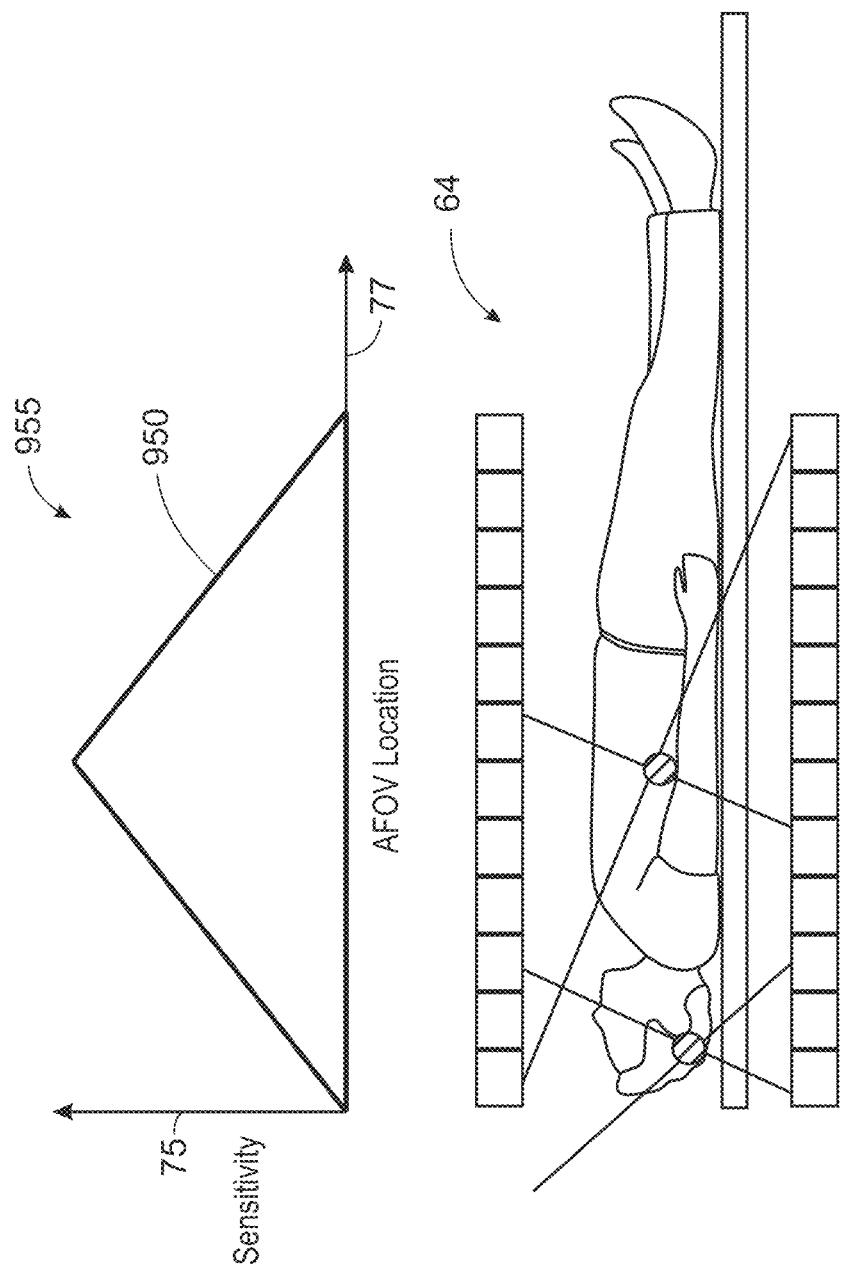
FIG. 5C is a graph of a sensitivity profile within an axial field of view of a PET scanner and a schematic view of the PET scanner during imaging of a large ROI relative to the sensitivity profile in accordance with aspects of the present disclosure.

FIG. 5C is a schematic view of a graph 955 a sensitivity profile 950 within an axial field of view of a PET scanner 64 (e.g., large axial field of view of the PET scanner 64) relative to the PET scanner 64. In this example, the ΔN–max is selected to be equal to the number of rings, the sensitivity profile is triangular.

Figure 5D:
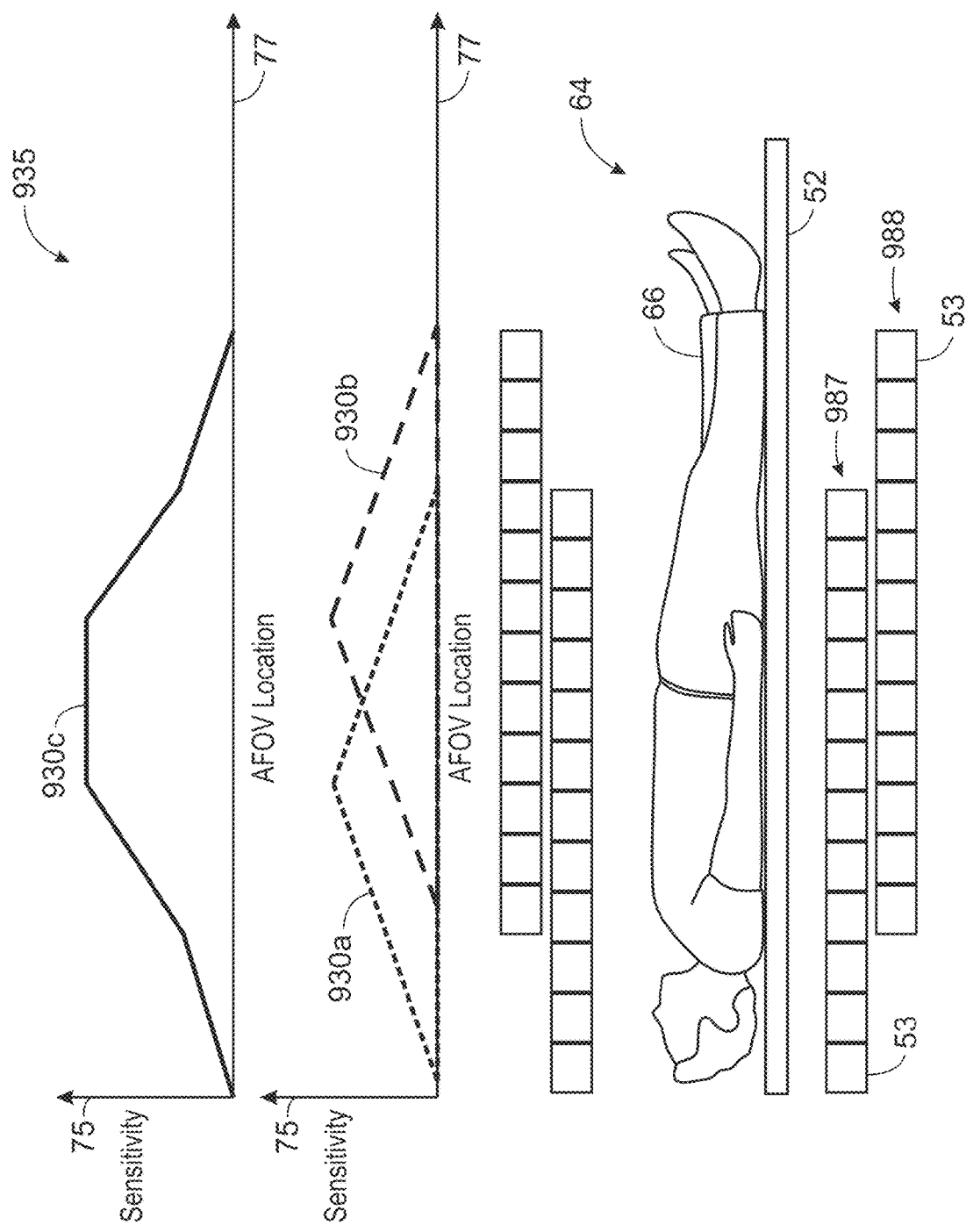
FIG. 5D is a graph of a sensitivity profile for overlapping scan ranges relative to an axial field of view of a PET scanner,) and a schematic view of the PET scanner relative to the sensitivity profile during imaging of a ROI larger than the axial field of view of a PET scanner, in accordance with aspects of the present disclosure.

In certain embodiments, as depicted in FIG. 5D, when the region of interest is greater than the AFOV, scans with overlapping ranges may be utilized. In particular, bed 52 (with patient 66) is translated such that the AFOV is translated in respect to the patient. In FIG. 5B, patient 66 is shown as a reference, and the two positions of detector rings 53 relative to the patient are illustrated and marked as 987 and 989 (the vertical displacement between 87 and 89 does not exist in reality). In FIG. 5C, graphs 930a and 930b shows the triangular sensitivities, when ΔN–max is selected to be equal to the number of rings, for patient positions 987 and 988 respectively.

The graph 930c represents an overall sensitivity profile for the two overlapping scan ranges as a results of adding the sensitivity profiles 930a and 930b for the overlapping region of the two scans.

Figure 6:
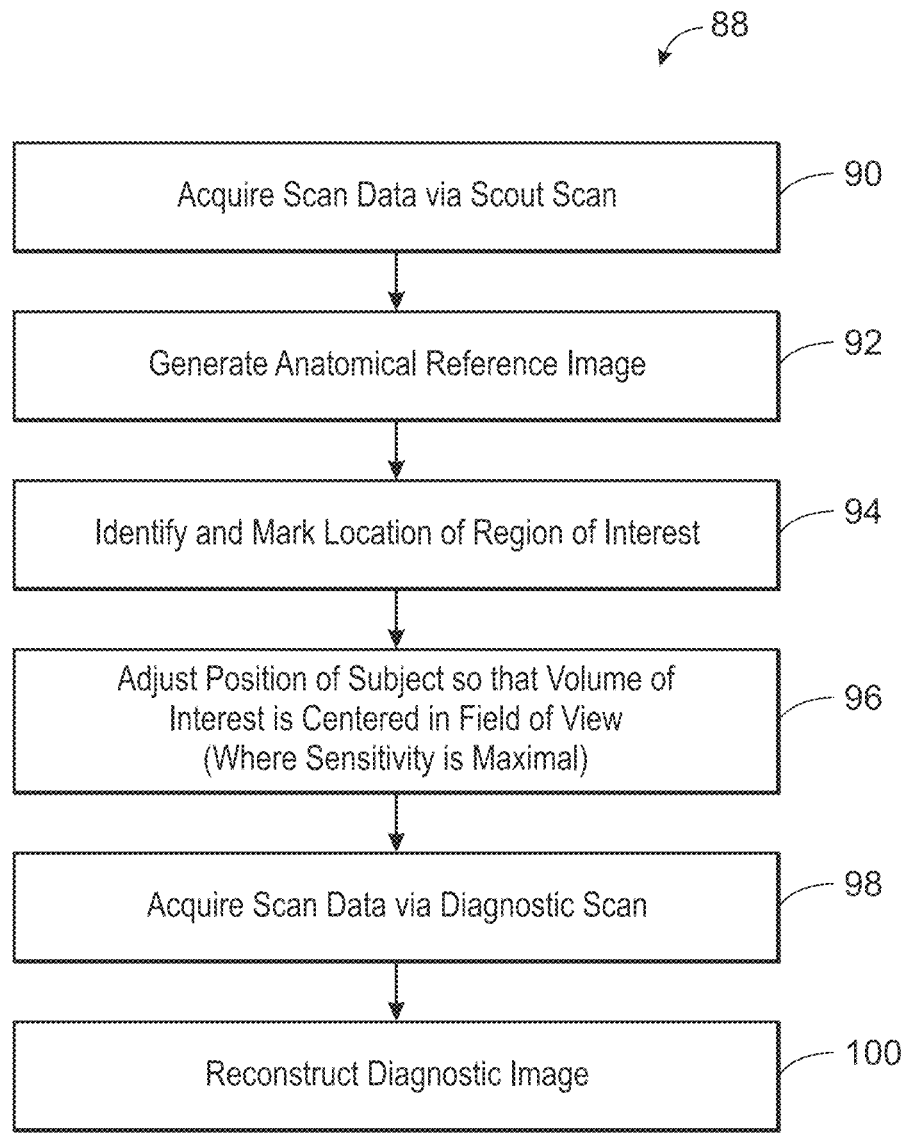
FIG. 6 is a flowchart of a method for positioning of a subject for imaging, in accordance with aspects of the present disclosure.

FIG. 6 is a flowchart of a method 88 for positioning of a subject for imaging. One or more steps of the method 88 may be performed by processing circuitry of the imaging systems discussed above. One or more of the steps of the method 88 may be performed simultaneously or in a different order from the order depicted in FIG. 6. In certain embodiments, the method 88 may be performed utilizing a dual-modality imaging system such as an emission tomography/CT imaging system (e.g., PET-CT imaging system 46 in FIG. 4 or a SPECT CT imaging system).

The method 88 includes acquiring scan data via a scout scan or an anatomical reference image (e.g., non-diagnostic scan) (block 90). A scout scan is typically performed prior to a diagnostic scan to set appropriate landmarks containing the region of interest of the subject (e.g., patient). Scout scans are typically lower resolution (and lower dose) than a diagnostic scan. In certain embodiments, the scan data is CT scan data acquired via the scout scan with a CT imaging system (e.g., as part of the emission tomography/CT imaging system). In certain embodiments, the anatomical reference image may be a PET scout image (e.g., acquired utilizing a PET scanner), an external CT image (e.g., acquired with a different CT scanner), an image acquired via a visible and near infrared camera, or any image that presents anatomical references. Scout CT scan may be performed with lower X-Ray dose to decrease radiation exposure. Scout PET scan can be a short duration scan, optionally includes bed motion to ensure that the entire ROI was included in the scout scan. In certain embodiments, the method 88 also includes generating an anatomical reference image (e.g., CT scout image, PET scout image, etc.) from the acquired scan data (block 92).

The method 88 further includes identifying and marking a location of a region of interest (ROI) on the anatomical reference image to be imaged (block 94). Automatic ROI identification is based on the selected diagnostic protocol. In certain embodiments, a user may provide input (e.g., on a graphical user interface) via an input device (e.g., of the operator workstation of the imaging system) to select or mark the region of interest. In certain embodiments, the region of interest or region of interest may be automatically identified (e.g., utilizing artificial intelligence to recognize the anatomy based on optical data provided by an optical system such as a camera adjacent the X-ray source of the CT imaging system).

The method 88 yet further includes adjusting a position of the subject so that the region of interest is centered in, or at least within the field to maximize detection sensitivity during a diagnostic scan with the emission tomography scanner (e.g., as part of the emission tomography/CT imaging system) (block 96). In certain embodiments, the position is adjusted manually. In certain embodiments, the position is adjusted automatically. The position of the subject is adjusted by moving the table (e.g., via a table controller) with the subject on it to adjust the position of the subject within the bore of the imaging system. Optionally, to reduce claustrophobia, patient positioning is selected such the ROI is within the field to maximize detection sensitivity during a diagnostic scan with the emission tomography scanner, but the head of the patient is outside or close to the opening of the bore of the camera.

The method 88 still further includes acquiring emission tomography scan data (e.g., PET scan data) of the region of interest or region of interest during a diagnostic scan with the emission tomography scanner (e.g., as part of the emission tomography/CT imaging system) (block 98). In certain embodiments, CT scan data of the region of interest may also be acquired during the diagnostic scan with the CT scanner (e.g., as part of the emission tomography/CT imaging system). In certain embodiments, the method 88 even further includes reconstructing or generating a diagnostic image based on the emission tomography scan data (block 100). The diagnostic image has higher image quality than the scout scan. In certain embodiments, the diagnostic scan is a PET image. In certain embodiments, the diagnostic image is a combination of a PET image with a CT image.

Figure 7:
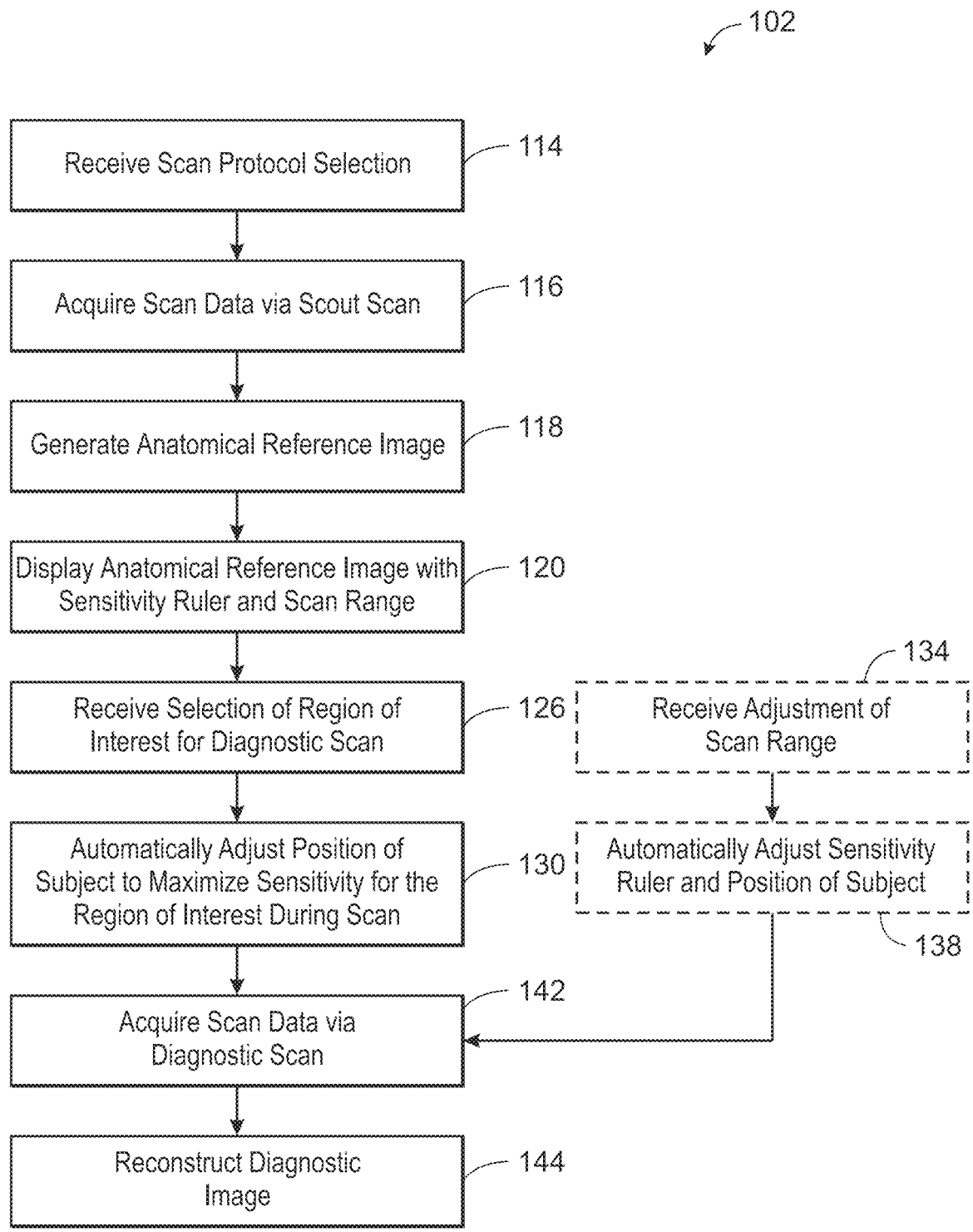
FIG. 7 is a flowchart of a method for positioning of a subject for imaging (e.g., based on a selected region of interest), in accordance with aspects of the present disclosure.

FIG. 7 is a flowchart of a method 102 for positioning of a subject for imaging (e.g., based on a selected region of interest). One or more steps of the method 102 may be performed by processing circuitry of the imaging systems discussed above. One or more of the steps of the method 102 may be performed simultaneously or in a different order from the order depicted in FIG. 7. In certain embodiments, the method 102 may be performed utilizing a dual-modality imaging system such as an emission tomography/CT imaging system (e.g., PET-CT imaging system 46 in FIG. 4 or a SPECT CT imaging system).

FIGS. 8A-8F are schematic diagrams of graphical user interfaces displaying an anatomical reference image with a sensitivity ruler 104 and a scan range 106 corresponding to the method 102 in FIG. 7. The scan range 106 indicates the area to be scanned during a diagnostic scan (with the emission tomography scanner). The sensitivity ruler 104 indicates a sensitivity (e.g., detection sensitivity) along an axial field of view of the emission tomography scanner.

Figures 8A, 8B, 8C:
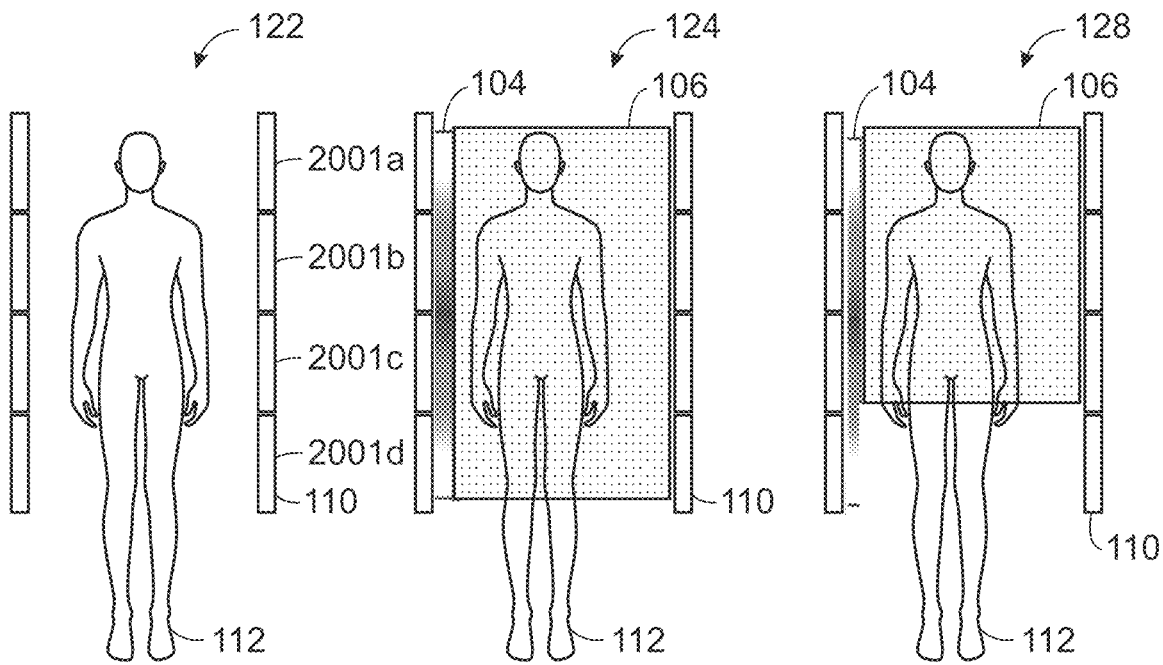
FIGS. 8A-8F are schematic diagrams of graphical user interfaces displaying an anatomical reference image with a sensitivity ruler and a scan range corresponding to the method in FIG. 7, in accordance with aspects of the present disclosure.
Figures 8D, 8E, 8F:
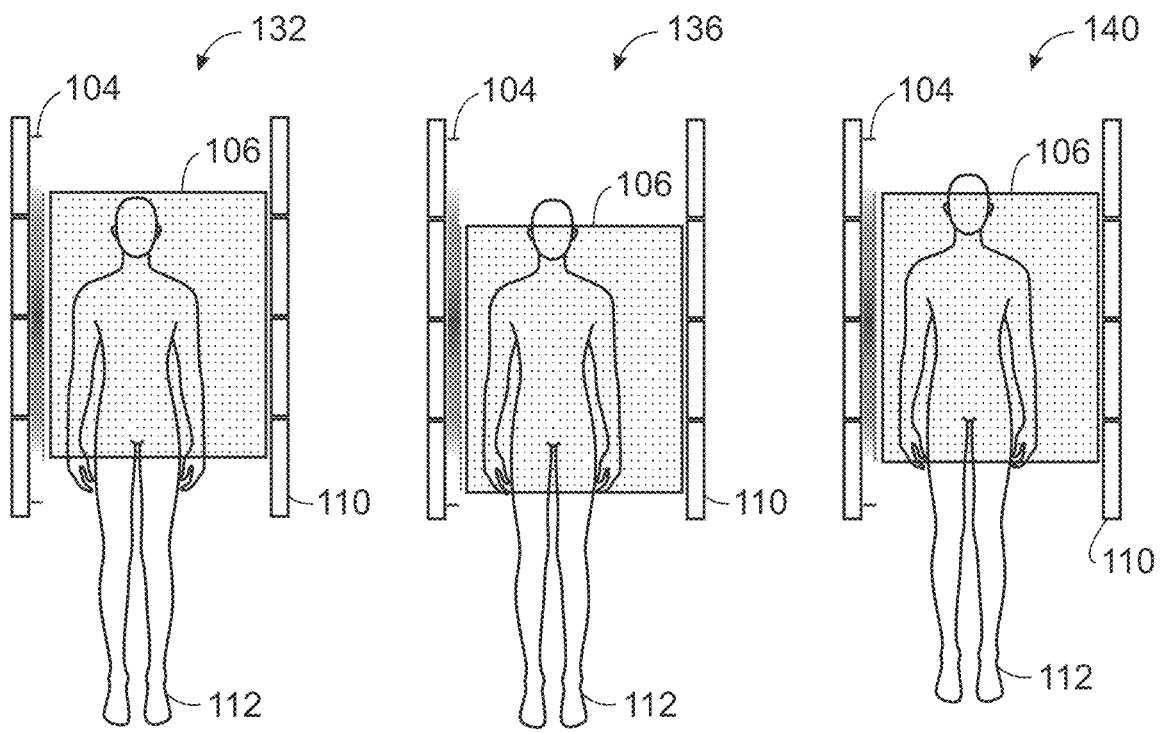
Figure 9:
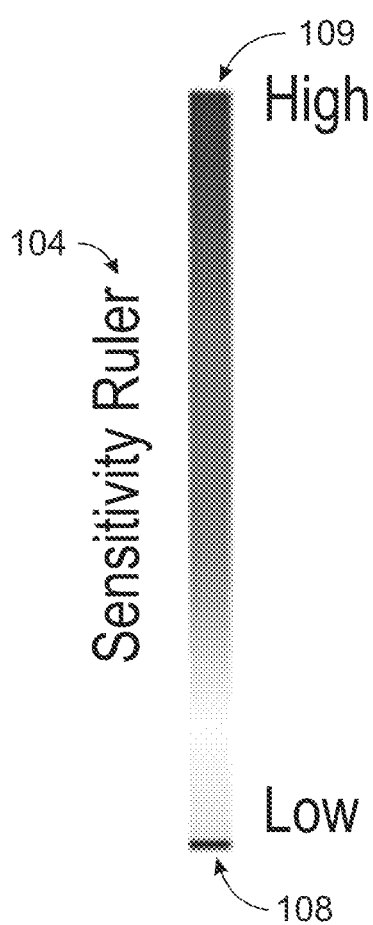
FIG. 9 is a schematic diagram of sensitivity levels of a sensitivity ruler, in accordance with aspects of the present disclosure.

FIG. 9 is a schematic diagram of sensitivity levels of the sensitivity ruler 104. The sensitivity levels of the sensitivity ruler 104 are gray or color coded as depicted in FIG. 9 from the lowest sensitivity to the highest sensitivity. In the sensitivity ruler 104 in FIG. 9, one end 108 of the sensitivity ruler 104 indicates the color for the lowest sensitivity and another end 109 of the sensitivity ruler 104 indicates the color for the highest sensitivity. The sensitivity levels indicated on the sensitivity rulers 104 on the graphical user interfaces in FIGS. 8A-8F, and FIGS. 11-14 indicate sensitivity at a particular location along the axial field of view. The sensitivity ruler 104 and the scan range 106 in the graphical user interfaces in FIGS. 8A-8F and FIGS. 11-14 are depicted relative to a displayed representation 110 of the emission tomography scanner. As depicted in FIG. 8A, reference numerals 2001a, 2001b, 2001c, and 2001d represent different regions of the emission tomography scanner. For example, the sensitivity ruler 104 is displayed along the axial field of view of the emission tomography scanner 110. An anatomical reference image 112 (represented by the outline of the subject) is depicted in the graphical user interfaces in FIGS. 8A-8F and FIGS. 11-14 relative to a location within the bore of the emission tomography scanner 110. It should be noted that optionally, in some cases, depending on the diagnostic protocol, only part of the patient is scanned during the scout scan and/or only part of the patient outline is displayed. In practice, a grayscale image is displayed for the anatomical reference image 112. The scan range 106 is superimposed over the anatomical reference image 112.

Returning to FIG. 7, the method 102 includes receiving a selection of a scan protocol for a diagnostic image (e.g., the target organ or organs or ROI to be acquired with an emission tomography scanner) (block 114). The selection of the scan protocol may be provided by a user via an input device of the operator workstation of the imaging system. Alternatively, or additionally, selection of the scan protocol may be provided by the hospital data center based on the scan scheduled for the patient.

The method 102 also includes acquiring scan data via a scout scan (e.g., non-diagnostic scan) (block 116). A scout scan is typically performed prior to a diagnostic scan to set appropriate landmarks containing the region of interest of the subject (e.g., patient). Scout scans are typically lower resolution (and lower dose) than a diagnostic scan. In certain embodiments, the scan data is CT scan data acquired via the scout scan with a CT imaging system (e.g., as part of the emission tomography/CT imaging system). In certain embodiments, the anatomical reference image may be a PET scout image (e.g., acquired utilizing a PET scanner), an external CT image (e.g., acquired with a different CT scanner), an image acquired via a visible and near infrared camera, or any image that presents anatomical references. The method 102 further includes generating a scout image (e.g., CT scout image) from the acquired scan data (block 118). The CT scout image can be a low-dose CT image, using lower current in the X-Ray tube in order to reduce risk to the patient.

The method 102 further includes causing display, on a graphical user interface, of the anatomical reference image with a sensitivity ruler and a scan range (block 120). As noted above, the sensitivity ruler indicates a detection sensitivity during a diagnostic scan with the emission tomography scanner. FIG. 8A depicts a graphical user interface 122 prior to providing the sensitivity ruler and the scan range. FIG. 8B depicts a graphical interface 124 that includes the sensitivity ruler 104 and the scan range 106 following block 120 in the method 102.

The method 102 still further includes receiving a selection of a region of interest of the subject to be imaged during the diagnostic scan (block 126). The selection of the region of interest to be imaged may be selected (or altered) on the graphical user interface via an input provided by the user via an input device of the operator workstation. FIG. 8C depicts a graphical user interface 128 with the scan range 106 altered based on the selected region of interest (e.g., relative to the scan range 106 in the graphical user interface 124). In the non-limiting example of FIG. 8C, the selected ROI is from the top of the head to the groin.

The method 102 even further includes automatically adjusting a position of the subject so that the region of interest is centered in the field to maximize detection sensitivity during a diagnostic scan with the emission tomography scanner (e.g., as part of the emission tomography/CT imaging system) based on the selected region of interest (block 130). The position of the subject is adjusted by moving the table (e.g., via a table controller) with the subject on it to adjust the position of the subject within the bore of the imaging system. FIG. 8D depicts a graphical user interface 132 with the position of the subject so that the region of interest is centered in region of maximal sensitivity. The scan range 106 in the graphical user interface 132 is adjusted relative to both the sensitivity ruler 104 and the scanner 110 (when compared to the graphical user interface 128 in FIG. 8C).

In certain embodiments, the method 102 includes receiving an adjustment of the scan range (block 134). The adjustment may be provided on the graphical user interface via an input provided by the user via an input device of an operator workstation. FIG. 8E depicts a graphical user interface 136 where the scan range 106 was adjusted (e.g., relative to the scan range 106 in the graphical user interface 132 in FIG. 8D). In certain embodiments, the method 102 also includes automatically adjusting both the sensitivity ruler (i.e., relative to the scan range 106) and position of the subject based on the adjustment of the scan range (block 138). The receiving of the adjustment of the scan range (block 134) and the adjustment of the sensitivity ruler and the position of the subject (block 138) may occur at any point prior acquiring the scan data for a diagnostic scan. FIG. 8F depicts a graphical user interface 140 where the scan range 106 and the position of the subject are adjusted in response to the adjustment in the scan range 106.

The method 102 still further includes acquiring emission tomography scan data (e.g., PET scan data) of the region of interest or region of interest during a diagnostic scan with the emission tomography scanner (e.g., as part of the emission tomography/CT imaging system) (block 142). In certain embodiments, CT scan data of the region of interest or the region of interest may also be acquired during the diagnostic scan with the CT scanner (e.g., as part of the emission tomography/CT imaging system). In certain embodiments, the method 102 even further includes reconstructing or generating a diagnostic image based on the emission tomography scan data (block 144). The diagnostic image has higher image quality than the scout scan. In certain embodiments, the diagnostic scan is a PET image. In certain embodiments, the diagnostic image is a combination of a PET image with a CT image.

Figure 10:
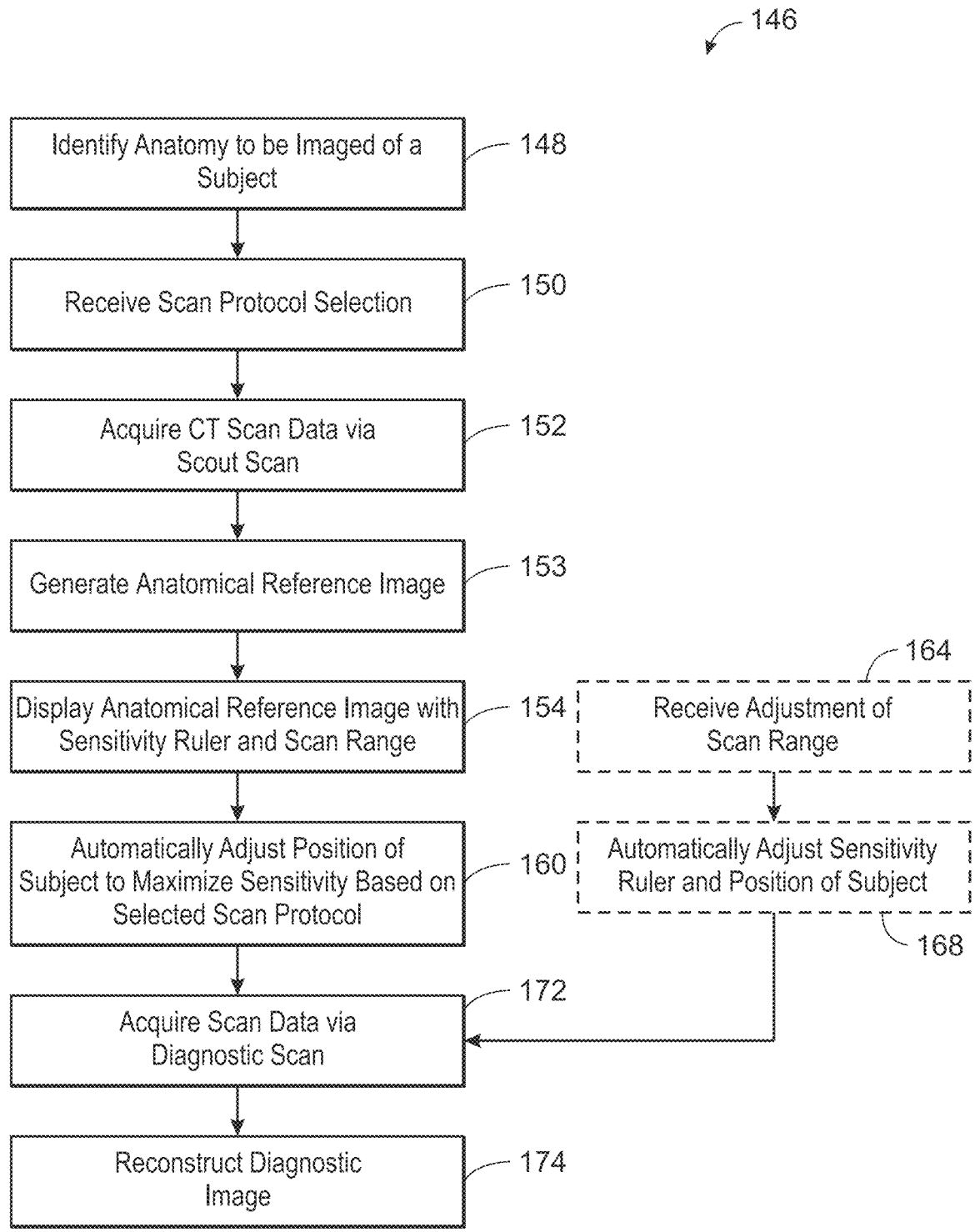
FIG. 10 is a flowchart of a method for positioning of a subject for imaging (e.g., based on a selected scan protocol), in accordance with aspects of the present disclosure.

FIG. 10 is a flowchart of a method 146 for positioning of a subject for imaging (e.g., based on a selected scan protocol). One or more steps of the method 146 may be performed by processing circuitry of the imaging systems discussed above. One or more of the steps of the method 146 may be performed simultaneously or in a different order from the order depicted in FIG. 10. In certain embodiments, the method 146 may be performed utilizing a dual-modality imaging system such as an emission tomography/CT imaging system (e.g., PET-CT imaging system 46 in FIG. 4 or a SPECT CT imaging system).

FIGS. 11A-11D are schematic diagrams of graphical user interfaces displaying an anatomical reference image with the sensitivity ruler 104 and the scan range 106 corresponding to the method 146 in FIG. 10. As noted above, the scan range 106 indicates the area to be scanned during a diagnostic scan (with the emission tomography scanner). Also, as noted above, the sensitivity ruler 104 indicates a sensitivity (e.g., detection sensitivity) along an axial field of view of the emission tomography scanner. The sensitivity ruler 104 and the scan range 106 in the graphical user interfaces in FIGS. 11A-11D are depicted relative to a displayed representation 110 of the emission tomography scanner. For example, the sensitivity ruler 104 is displayed along the axial field of view of the emission tomography scanner 110. An anatomical reference image 112 (represented by the outline of the subject) is depicted in the graphical user interfaces in FIGS. 11A-11D relative to a location within the bore of the emission tomography scanner 110. In practice, a grayscale image is displayed for the anatomical reference image 112. Alternatively, a false color image is displayed, or the contour of the subject is displayed. Optionally, only the relevant part of the subject is scanned during the scout scan, and/or only the relevant part of the subject is displayed. The anatomical reference range 106 is superimposed over the anatomical reference image 112.

Returning to FIG. 10, the method 146 includes identifying the anatomy to be imaged of the subject (block 148). The identification may occur automatically (e.g., utilizing artificial intelligence to recognize the anatomy based on optical data provided by an optical system such as a camera adjacent the X-ray source of the CT imaging system). The method 146 also includes receiving a selection of a scan protocol for a diagnostic image (e.g., to be acquired with an emission tomography scanner) (block 150). The selection of the scan protocol may be provided by a user via an input device of the operator workstation of the imaging system. Alternatively, or additionally, selection of the scan protocol may be provided by the hospital data center based on the scan scheduled for the patient.

The method 146 further includes acquiring scan data via a scout scan (e.g., non-diagnostic scan) (block 152). A scout scan is typically performed prior to a diagnostic scan to set appropriate landmarks containing the region of interest of the subject (e.g., patient). Scout scans are typically lower resolution (and lower dose) than a diagnostic scan. In certain embodiments, the scan data is CT scan data acquired via the scout scan with a CT imaging system (e.g., as part of the emission tomography/CT imaging system). In certain embodiments, the anatomical reference image may be a PET scout image (e.g., acquired utilizing a PET scanner), an external CT image (e.g., acquired with a different CT scanner), an image acquired via a visible and near infrared camera, or any image that presents anatomical references. The method 146 further includes generating an anatomical reference image (e.g., CT scout image, PET scout image, etc.) from the acquired scan data (block 152).

The method 146 further includes causing display, on a graphical user interface, of the anatomical reference image with a sensitivity ruler and a scan range (block 154). As noted above, the sensitivity ruler indicates a detection sensitivity during a diagnostic scan with the emission tomography scanner.

Figure 11A:
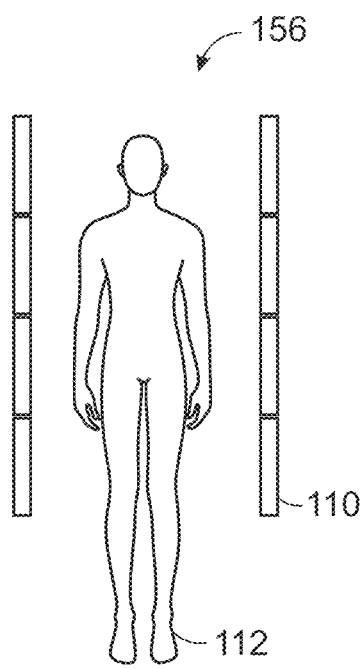
FIGS. 11A-11D are schematic diagrams of graphical user interfaces displaying an anatomical reference image with a sensitivity ruler and a scan range corresponding to the method in FIG. 10, in accordance with aspects of the present disclosure.
Figure 11B:
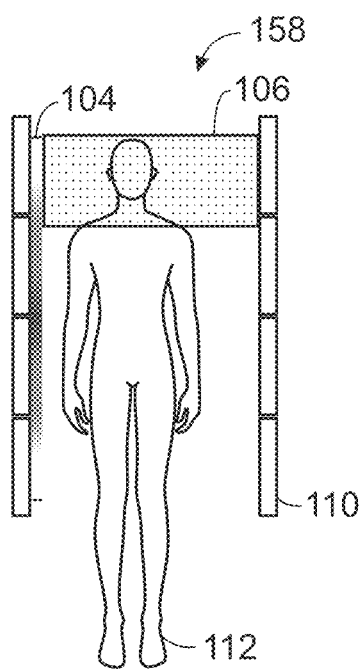

FIG. 11A depicts a graphical user interface 156 prior to providing the sensitivity ruler and the scan range. FIG. 11B depicts a graphical interface 158 that includes the sensitivity ruler 104 and the scan range 106 following block 154 in the method 146. In the non-limiting example of FIG. 11B the scan range includes the head and neck of the patient.

Figure 11C:
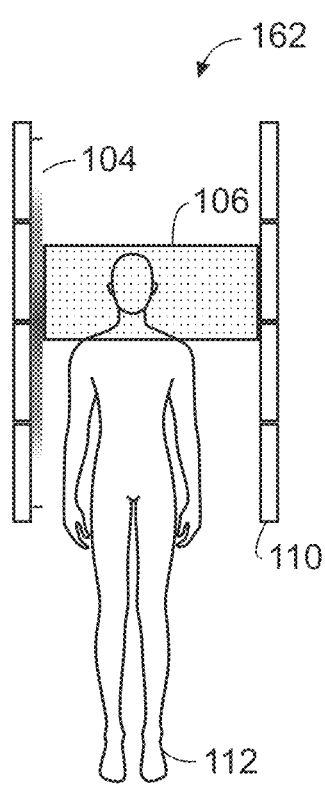

The method 146 even further includes automatically adjusting a position of the subject so that the region of interest is centered in the field to maximize detection sensitivity during a diagnostic scan with the emission tomography scanner (e.g., as part of the emission tomography/CT imaging system) based on the selected scan protocol (block 160). The position of the subject is adjusted by moving the table (e.g., via a table controller) with the subject on it to adjust the position of the subject within the bore of the imaging system. FIG. 11C depicts a graphical user interface 162 with the position of the subject so that the region of interest is centered in region of maximal sensitivity. The scan range 106 in the graphical user interface 162 is adjusted relative to both the sensitivity ruler 104 and the scanner 110 (when compared to the graphical user interface 158 in FIG. 11B).

Figure 11D:
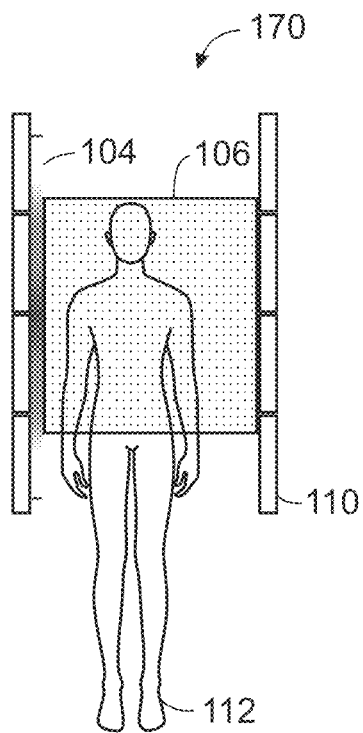

In certain embodiments, the method 146 includes receiving an adjustment of the scan range (block 164). The adjustment may be provided on the graphical user interface via an input provided by the user via an input device of an operator workstation. In certain embodiments, the method 146 also includes automatically adjusting both the sensitivity ruler (i.e., relative to the scan range 106) and position of the subject based on the adjustment of the scan range (block 168). The receiving of the adjustment of the scan range (block 164) and the adjustment of the sensitivity ruler and the position of the subject (block 168) may occur at any point prior acquiring the scan data for a diagnostic scan. FIG. 11D depicts a graphical user interface 170 where the scan range 106 and the position of the subject are adjusted in response to the adjustment in the scan range 106.

The method 146 still further includes acquiring emission tomography scan data (e.g., PET scan data) of the region of interest or region of interest during a diagnostic scan with the emission tomography scanner (e.g., as part of the emission tomography/CT imaging system) (block 172). In certain embodiments, CT scan data of the region of interest or the region of interest may also be acquired during the diagnostic scan with the CT scanner (e.g., as part of the emission tomography/CT imaging system). In certain embodiments, the method 146 even further includes reconstructing or generating a diagnostic image based on the emission tomography scan data (block 174). The diagnostic image has higher image quality than the scout scan. In certain embodiments, the diagnostic scan is a PET image. In certain embodiments, the diagnostic image is a combination of a PET image with a CT image.

Figure 12:
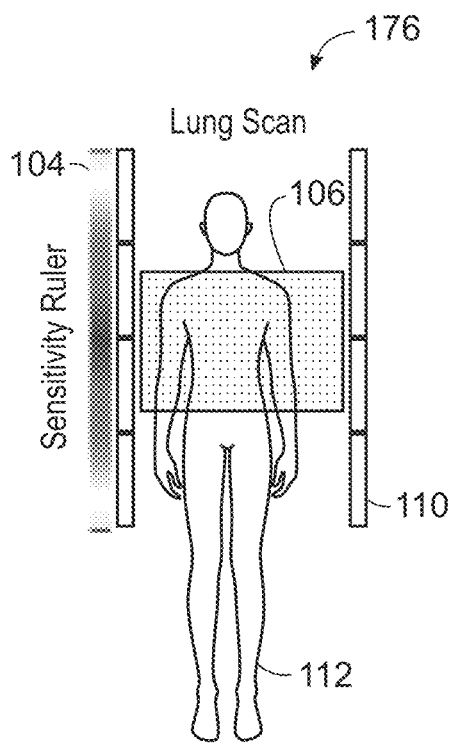
FIG. 12 is a schematic diagram of a graphical user interface displaying an anatomical reference image with a sensitivity ruler and a scan range for a lung scan, in accordance with aspects of the present disclosure.
Figure 13:
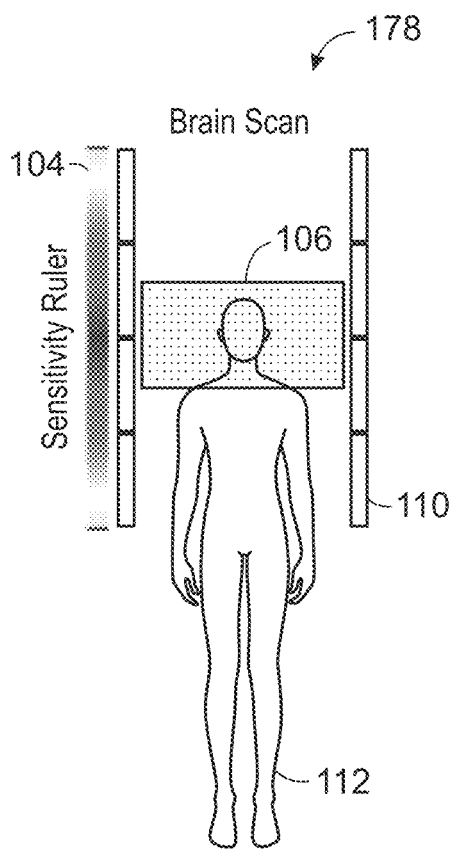
FIG. 13 is a schematic diagram of a graphical user interface displaying an anatomical reference image with a sensitivity ruler and a scan range for a brain scan, in accordance with aspects of the present disclosure.
Figure 14:
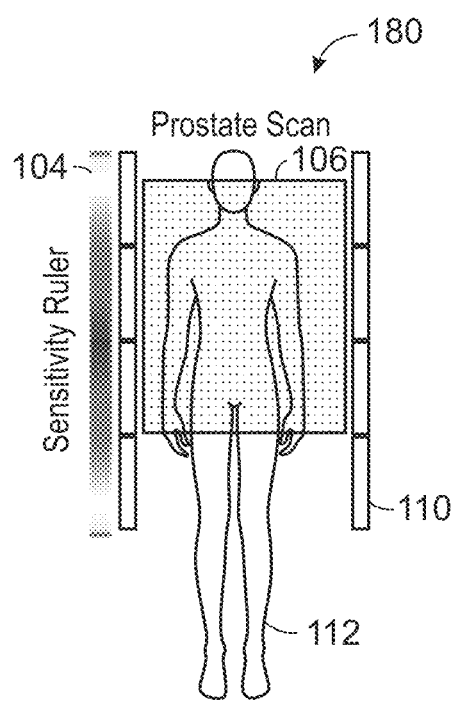
FIG. 14 is a schematic diagram of a graphical user interface displaying an anatomical reference image with a sensitivity ruler and a scan range for a prostate scan, in accordance with aspects of the present disclosure.

FIGS. 12-14 depict schematic diagrams of different graphical user interfaces for imaging different regions of interest of the subject. FIG. 12 is a schematic diagram of a graphical user interface 176 displaying the anatomical reference image 112 with the sensitivity ruler 104 and the scan range 106 for a lung scan. FIG. 13 is a schematic diagram of a graphical user interface 178 displaying the anatomical reference image 112 with the sensitivity ruler 104 and the scan range 106 for a brain scan. FIG. 14 is a schematic diagram of a graphical user interface 180 displaying the anatomical reference image 112 with the sensitivity ruler 104 and the scan range 106 for a prostate scan. As depicted in FIGS. 12-14, the position of the subject relative to the scanner 110 to center the region of interest in the axial field of view to maximize detection sensitivity differs depending on the region of interest being scanned. Also, as depicted in FIGS. 12-14, the size and location of the scan range 106 differs depending on the region of interest being scanned.

In certain embodiments, a desired scan range is longer that the zone of constant sensitivity of the detector (e.g., the region of interest is greater than the AFOV as demonstrated in FIG. 5B). To address this scenario, in certain embodiments, a longer acquisition time may be utilized to increase the effective scan range.

Figure 15A:
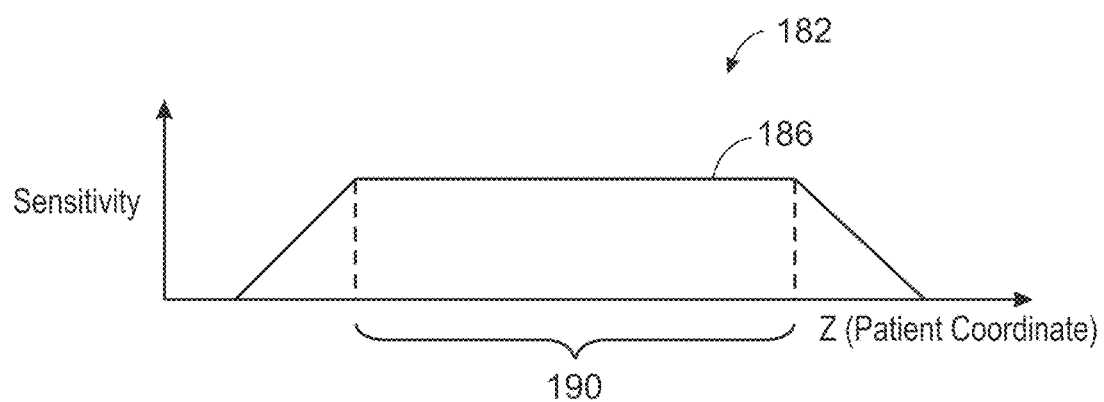
FIGS. 15A and 15B are graphs of a sensitivity profile for a PET scan with a standard acquisition time and a sensitivity profile for a PET scan with an increased acquisition time, in accordance with aspects of the present disclosure.
Figure 15B:
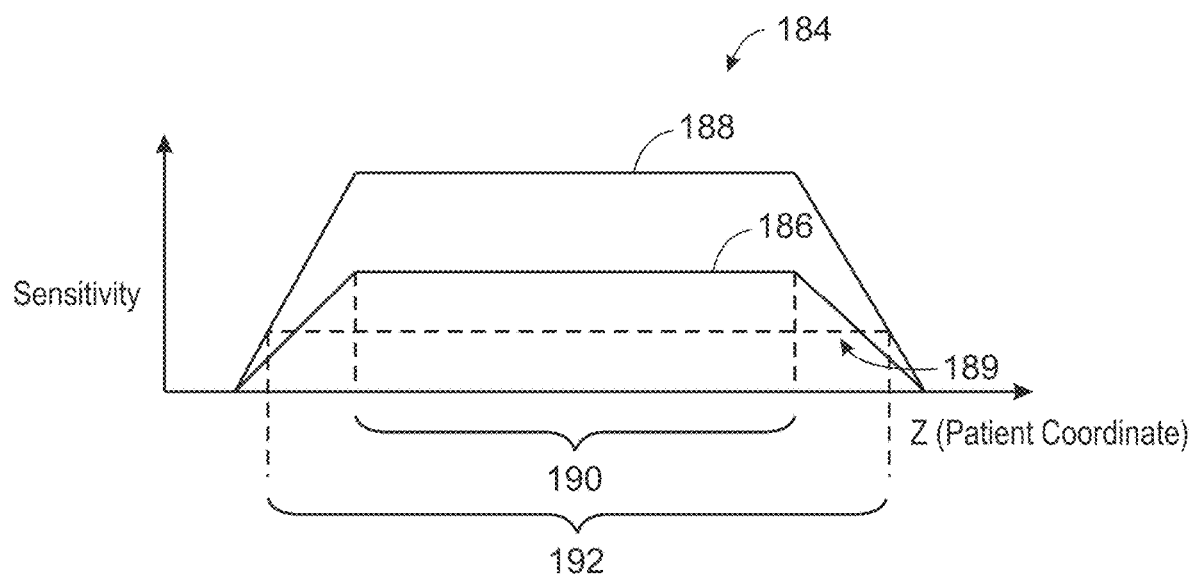

FIGS. 15A and 15B are graphs 182, 184 of a sensitivity profile 186 for a PET scan with a standard acquisition time and a sensitivity profile 188 for a PET scan with an increased acquisition time, respectively. In particular, the graph 184 illustrates the sensitivity profile 186 versus the sensitivity profile 188. The effective sensitivity of a detector (e.g., PET scanner) for a source within the patient is its ability to detect events emitted from a location within the patient. The longer the acquisition time, the more events that will be detected. However, there is a minimal sensitivity (indicate by the dotted line reference numeral 189) required to generate an image (e.g., PET image) with sufficient image quality for diagnostic purposes (e.g., as determined by the clinical protocol (e.g., oncology, etc.). By increasing the acquisition time, the effective acquisition zone can include some of the sloping ends of the trapezoidal sensitivity curve, which can be utilized to slightly increase the scan range. However, image quality is not uniform, as less events are collected for the two ends of the scan range. A zone of constant sensitivity of the sensitivity profile 186 is indicated by reference numeral 190. An effective acquisition range of the sensitivity profile 188 is indicated by reference numeral 192. The effective acquisition range 192 (e.g., effective scan range) is greater than the zone of constant sensitivity 190 due to utilizing a longer acquisition time. Optionally, the methods of FIGS. 6, 7 and 10 further comprise the step of automatically adjusting the acquisition time accordingly. Alternatively, the methods of FIGS. 6, 7 and 10 further comprise the step of suggesting to the user to increase the acquisition time accordingly.

In certain embodiments, when the desired scan range is longer that the zone of constant sensitivity of the detector (as demonstrated in FIGS. 5B and 5D), two different patient positions with overlapping scan ranges can be utilized in PET imaging a patient. For a longer bore PET scanner (e.g., having a scan range of approximately 120 centimeters (cm)), placing the patient in non-overlapping positions is not practical as this will create a combined scan range of approximately 240 cm (which is larger than the average patient). Additionally, the bed (e.g. table) maximum travel may be shorter. Thus, the PET imaging system automatically moves the table to the first patient position where a first acquisition is performed. Then, the PET imaging system automatically moves the table to the second patient position where a second acquisition is performed.

Figure 16A:
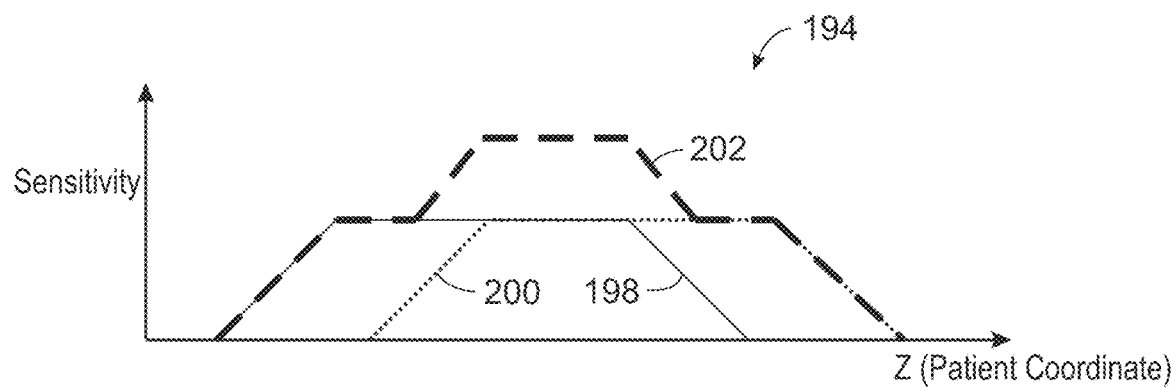
FIGS. 16A, 16B, and 16C are graphs of sensitivity profiles for overlapping PET scans acquired of a patient at two different positions, a combined sensitivity profile of the overlapping PET scans acquired of the patient at the two different positions, and a combined sensitivity profile of the overlapping PET scans acquired of the patient at the two different positions (e.g., with events deleted or ignored or detector rings turned off for one of the scans), respectively, in accordance with aspects of the present disclosure.
Figure 16B:
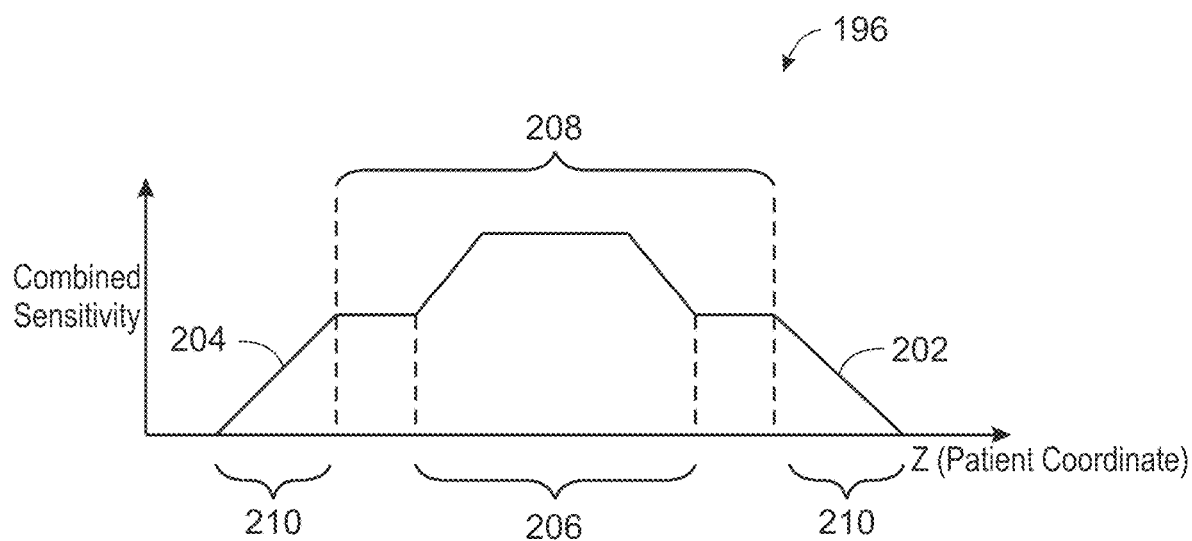

FIGS. 16A and 16B are graphs 194, 196 of the combined sensitivity profiles 198, 200 for overlapping PET scans acquired of a patient at two different bed positions and a combined sensitivity profile 202 of the overlapping PET scans acquired of the patient at the two different positions, respectively. With two overlapping scan ranges, the combined sensitivity profile 202 has a central section 206 (i.e., zone of increased sensitivity) of twice the original sensitivity. The image quality over a desired scan range 208 (which excludes the sloping ends 210 which are zones of reduced sensitivity) is sufficient and can be used in certain embodiments.

Some physicians prefer consistent image quality over an image having a central section with lower noise due to larger statistics (i.e., more detected events). In certain embodiments, the PET imaging system randomly ignores (e.g., randomly deletes) the appropriate number of events detected in the area of increase sensitivity 206, thus, creating consistent image quality (and constant sensitivity) for the entire desired scan range 208.

Figure 16C:
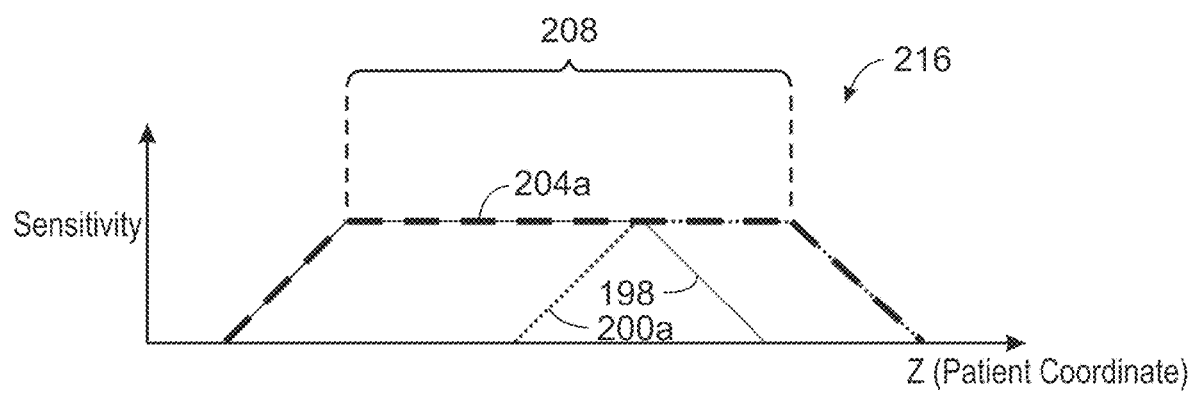

Referring now to FIG. 16C, which schematically shows another embodiment of providing constant sensitivity throughout the entire desired scan range 208. For example, as depicted in graph 216 in FIG. 16C, by turning off (or ignoring events from) some of the detector rings (for one of the scans from the two different patient positions), the effective scan range (e.g., as indicated in sensitivity profile 200a) is shortened when compared to graph 200 in FIG. 16A. This causes the combined sensitivity profile 204a to be flat throughout the desired scan range 208 shown in FIG. 16C. It should be noted that selection of which of the two sensitivity graphs (198 or 200) to shorten is arbitrary. Optionally, both sensitivity graphs (198 and 200) may be shortened such that their combined sensitivity graph is flat throughout the desired scan range 208.

Alternatively yet, full data sets are acquired in each bed position. Each data set is reconstructed separately to form a separate 3-D image of the patient. The two images are then combined by selecting a transition plane that appears in both 3-D images, where the transition from one image to the other is minimally visible.

Referring now back to FIG. 5C, optionally, the methods of FIGS. 6, 7 and 10 further comprise the step of automatically adjusting position of the subject and/or the acquisition time of a PET system having a triangular sensitivity profile, such that the selected ROI will be acquired with sufficient image quality. Optionally, the sufficient image quality is determined according to the diagnostic protocol and/or patient's biometrics. Alternatively, the methods of FIGS. 6, 7 and 10 further comprise the step of suggesting to the user to adjust the acquisition time accordingly.

Some physicians prefer consistent image quality over an image having a central section with lower noise due to larger statistics (i.e., more detected events). In certain embodiments, the PET imaging system having a triangular sensitivity, randomly ignores (e.g., randomly deletes) the appropriate number of events as to creating consistent image quality (and constant sensitivity) for the entire desired scan range 208.

Referring now back to FIG. 5D, optionally, the methods of FIGS. 6, 7 and 10 further comprise the step of automatically adjusting the two positions of the subject and/or the acquisition time of a PET system having a triangular sensitivity profile, such that the selected large ROI will be acquired with sufficient image quality. Optionally, the sufficient image quality is determined according to the diagnostic protocol and/or patient's biometrics. Alternatively, the methods of FIGS. 6, 7 and 10 further comprise the step of suggesting to the user to adjust the acquisition positions and/or time accordingly.

Some physicians prefer consistent image quality over an image having a central section with lower noise due to larger statistics (i.e., more detected events). In certain embodiments, the PET imaging system having a triangular sensitivity, randomly ignores (e.g., randomly deletes) the appropriate number of events from the data acquired in the two bed positions as to creating consistent image quality (and constant sensitivity) for the entire desired scan range 208.

Technical effects of the disclosed embodiments include providing systems and methods for positioning of a subject (e.g., patient) for imaging (e.g., PET imaging imaging). In particular, the described systems and methods adjust a position of the subject so that a region of interest of the subject to be imaged is located within a central area of an axial field of view of the emission tomography scanner (e.g., along a longitudinal axis of the emission tomography scanner) to maximize detection sensitivity during a diagnostic scan with the emission tomography scanner. Technical effects of the disclosed embodiments include ensuring that a region of interest is located in the area of maximal detection sensitivity during the diagnostic scan to improve the quality of the diagnostic image of the region of interest.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for positioning of a subject for imaging, comprising:
   generating, via a processor, an anatomical reference image of the subject based on scan data acquired of the subject during a scout scan;
   causing, via the processor, display, on a graphical user interface, of the anatomical reference image with a sensitivity ruler and a scan range, wherein the sensitivity ruler indicates a detection sensitivity along an axial field of view of an emission tomography scanner, and wherein the anatomical reference image is displayed within a representation of the emission tomography scanner, the sensitivity ruler is displayed along the axial field of view of the representation of the emission tomography scanner, and the scan range is superimposed over the anatomical reference image;
   automatically adjusting, via the processor, a position of the subject so that a region of interest to be imaged is centered within the axial field of view to maximize the detection sensitivity during a diagnostic scan with the emission tomography scanner;
   acquiring, via the processor, emission tomography scan data of the region of interest during the diagnostic scan with the emission tomography scanner; and
   reconstructing, via the processor, a diagnostic image based on the emission tomography scan data, wherein the diagnostic image has higher image quality than the anatomical reference image.

2. The computer-implemented method of claim 1, further comprising, prior to the scout scan, receiving, at the processor, a selection of a scan protocol for the diagnostic scan.

3. The computer-implemented method of claim 2, further comprising, prior to adjusting the position of the subject, receiving a selection of the region of interest to be imaged during the diagnostic scan.

4. The computer-implemented method of claim 3, wherein automatically adjusting the position of the subject is based on the selection of the region of interest.

5. The computer-implemented method of claim 2, further comprising, prior to the scout scan, identifying, via the processor, an anatomy of the subject.

6. The computer-implemented method of claim 2, wherein automatically adjusting the position of the subject is based on the selection of the scan protocol.

7. The computer-implemented method of claim 2, further comprising:
   receiving, at the processor, an adjustment of the scan range; and
   automatically adjusting, via the processor, both the sensitivity ruler and the position of the subject based on the adjustment of the scan range.

8. The computer-implemented method of claim 1, further comprising, acquiring, via the processor, the scan data during the scout scan with a computed tomography scanner.

9. A system for positioning of a subject for imaging, comprising:
   a memory encoding processor-executable routines;
   a processor configured to access the memory and to execute the processor-executable routines, wherein the processor-executable routines, when executed by the processor, cause the processor to:
      generate an anatomical reference image of the subject based on scan data acquired of the subject during a scout scan;
      cause display, on a graphical user interface, of the anatomical reference image with a sensitivity ruler and a scan range, wherein the sensitivity ruler indicates a detection sensitivity along an axial field of view of an emission tomography scanner, and wherein the anatomical reference image is displayed within a representation of the emission tomography scanner, the sensitivity ruler is displayed along the axial field of view of the representation of the emission tomography scanner, and the scan range is superimposed over the anatomical reference image;
      automatically adjust a position of the subject so that a region of interest to be imaged is centered within the axial field of view to maximize the detection sensitivity during a diagnostic scan with the emission tomography scanner;
      acquire emission tomography scan data of the region of interest during the diagnostic scan with the emission tomography scanner; and
      reconstruct a diagnostic image based on the emission tomography scan data, wherein the diagnostic image has higher image quality than the anatomical reference image.

10. The system of claim 9, wherein the processor-executable routines, when executed by the processor, cause the processor, prior to the scout scan, to receive a selection of a scan protocol for the diagnostic scan.

11. The system of claim 10, wherein the processor-executable routines, when executed by the processor, cause the processor, prior to adjusting the position of the subject, to receive a selection of the region of interest to be imaged during the diagnostic scan.

12. The system of claim 11, wherein automatically adjusting the position of the subject is based on the selection of the region of interest.

13. The system of claim 10, wherein the processor-executable routines, when executed by the processor, cause the processor, prior to the scout scan, to identify an anatomy of the subject.

14. The system of claim 10, wherein automatically adjusting the position of the subject is based on the selection of the scan protocol.

15. The system of claim 10, wherein the processor-executable routines, when executed by the processor, cause the processor to:
    receive an adjustment of the scan range; and
    automatically adjust both the sensitivity ruler and the position of the subject based on the adjustment of the scan range.

16. The system of claim 9, wherein the processor-executable routines, when executed by the processor, cause the processor to acquire the scan data during the scout scan with a computed tomography scanner.

17. A non-transitory computer-readable medium, the computer-readable medium comprising processor-executable code that when executed by a processor, causes the processor to:
    generate an anatomical reference image of a subject based on scan data acquired of the subject during a scout scan;
    cause display, on a graphical user interface, of the anatomical reference image with a sensitivity ruler and a scan range, wherein the sensitivity ruler indicates a detection sensitivity along an axial field of view of an emission tomography scanner, and wherein the anatomical reference image is displayed within a representation of the emission tomography scanner, the sensitivity profile is displayed along the axial field of view of the representation of the emission tomography scanner, and the scan range is superimposed over the reference image;

automatically adjust a position of the subject so that a region of interest to be imaged is centered within the axial field of view to maximize the detection sensitivity during a diagnostic scan with the emission tomography scanner;

acquire emission tomography scan data of the region of interest during the diagnostic scan with the emission tomography scanner; and reconstruct a diagnostic image based on the emission tomography scan data, wherein the diagnostic image has higher image quality than the anatomical reference image.

18. The non-transitory computer-readable medium of claim 17, wherein the processor-executable code, when executed by the processor, cause the processor, prior to the scout scan, to receive a selection of a scan protocol for the diagnostic scan.

19. The non-transitory computer-readable medium of claim 18, wherein automatically adjusting the position of the subject is based on the selection of the scan protocol.

20. The non-transitory computer-readable medium of claim 17, wherein the processor-executable code, when executed by the processor, cause the processor, prior to adjusting the position of the subject, to receive a selection of the region of interest to be imaged during the diagnostic scan, and wherein automatically adjusting the position of the subject is based on the selection of the region of interest.

* * * * *